(12) United States Patent
Du et al.

(10) Patent No.: US 11,184,135 B2
(45) Date of Patent: Nov. 23, 2021

(54) INFORMATION TRANSMISSION METHOD AND APPARATUS

(71) Applicant: Huawei Technologies Co., Ltd., Shenzhen (CN)

(72) Inventors: Zhenguo Du, Shenzhen (CN); Hongcheng Zhuang, Dongguan (CN); Zhiming Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/614,929

(22) PCT Filed: Jul. 21, 2017

(86) PCT No.: PCT/CN2017/093946
§ 371 (c)(1),
(2) Date: Nov. 19, 2019

(87) PCT Pub. No.: WO2018/209803
PCT Pub. Date: Nov. 22, 2018

(65) Prior Publication Data
US 2020/0195407 A1 Jun. 18, 2020

(30) Foreign Application Priority Data
May 19, 2017 (CN) .......................... 201710359142.0

(51) Int. Cl.
*H04L 5/00* (2006.01)
*H04W 4/029* (2018.01)
(Continued)

(52) U.S. Cl.
CPC ............ *H04L 5/0053* (2013.01); *H04L 5/006* (2013.01); *H04L 5/0094* (2013.01); *H04W 4/029* (2018.02);
(Continued)

(58) Field of Classification Search
CPC . H04W 24/08; H04W 72/0453; H04W 72/02; H04W 72/04; H04W 72/0413;
(Continued)

(56) References Cited

U.S. PATENT DOCUMENTS

2010/0103899 A1\* 4/2010 Kwak et al. .................. 370/329
2015/0327275 A1 11/2015 Kwon et al.
(Continued)

FOREIGN PATENT DOCUMENTS

CN 106165482 A 11/2016
CN 106550470 A 3/2017
(Continued)

OTHER PUBLICATIONS

Nokia, et al., "Grant-free HARQ for URLLC," R1-1612252, 3GPP TSG-RAN WG1 #87,Reno, NV, USA, Nov. 14-18, 2016, 3 pages.
(Continued)

*Primary Examiner* — Meless N Zewdu
(74) *Attorney, Agent, or Firm* — Conley Rose, P.C.

(57) ABSTRACT

An information transmission method apparatus, where the method includes determining, by a network device, first indication information, where the first indication information indicates a configuration of a second resource, the second resource transmits retransmission data including retransmission data of first data, the first data is received from a first terminal device using a first resource unit, the first resource unit belongs to a preconfigured first resource, the first resource and the second resource are both grant-free resources and are different from each other, and the first indication information is determined by the network device based on a receiving status of the first data, and sending, by the network device, the first indication information.

20 Claims, 10 Drawing Sheets

(51) Int. Cl.
*H04W 64/00* (2009.01)
*H04W 72/04* (2009.01)
*H04W 72/14* (2009.01)
*H04W 74/04* (2009.01)

(52) U.S. Cl.
CPC ..... *H04W 64/003* (2013.01); *H04W 72/0453* (2013.01); *H04W 72/14* (2013.01); *H04W 74/04* (2013.01)

(58) Field of Classification Search
CPC . H04W 72/085; H04W 72/044; H04W 72/14; H04W 72/1284; H04W 4/029; H04W 64/00; H04W 64/003; H04W 74/0833; H04W 74/00; H04W 74/04; H04W 74/08; H04W 88/00; H04W 88/02; H04W 88/08; H04W 74/002; H04W 74/008; H04W 74/085; H04W 74/0866; H04W 88/18; H04W 92/00; H04W 92/10; H04W 4/20; H04W 8/18; H04W 8/22; H04W 8/24; H04W 72/00; H04W 72/0406; H04W 72/042; H04W 72/0446; H04W 72/0486; H04W 72/082; H04W 74/004; H04W 74/006; H04W 76/00; H04W 76/10; H04W 76/11; H04W 76/14; H04W 72/1278; H04W 72/1289; H04W 72/1294; H04L 5/00; H04L 5/006; H04L 5/0053; H04L 5/0094; H04L 1/1887; H04L 1/1893; H04L 1/18; H04L 5/0055; H04L 5/22; H04L 5/003; H04L 5/0032; H04L 5/0037
See application file for complete search history.

(56) References Cited

U.S. PATENT DOCUMENTS

| | | | |
|---|---|---|---|
| 2016/0183276 A1* | 6/2016 | Marinier et al. | H04W 72/12 |
| 2018/0139774 A1* | 5/2018 | Ma et al. | H04W 72/1289 |
| 2018/0176945 A1* | 6/2018 | Cao et al. | H04W 72/14 |
| 2019/0297635 A1* | 9/2019 | Wu et al. | H04W 72/1268 |
| 2020/0052811 A1* | 2/2020 | Li et al. | H04L 1/0006 |
| 2020/0195407 A1* | 6/2020 | Du et al. | H04L 5/0053 |

FOREIGN PATENT DOCUMENTS

| | | |
|---|---|---|
| WO | 2016004994 A1 | 1/2016 |
| WO | 2016148622 A1 | 9/2016 |
| WO | 2016206083 A1 | 12/2016 |

OTHER PUBLICATIONS

Zte, et al., "Discussion on HARQ for Grant Free Based Transmission," R1-1611501, 3GPP TSG RAN WG1 Meeting #87, Reno, USA, Nov. 14-18, 2016, 3 pages.

Machine Translation and Abstract of Chinese Publication No. CN106550470, Mar. 29, 2017, pages.

HTC, "HARQ retransmission in grant-free NOMA," R1-1701009, 3GPP TSG RAN WG1 NR Ad-Hoc Meeting, Spokane, USA, Jan. 16-20, 2017, 5 pages.

"Institute for Information Industry (III), Uplink Grant Free Transmission for URLLC," R1-1709126, 3GPP TSG-RAN WG1 Meeting #89, Hangzhou, P.R. China, May 15-19, 2017, 4 pages.

\* cited by examiner

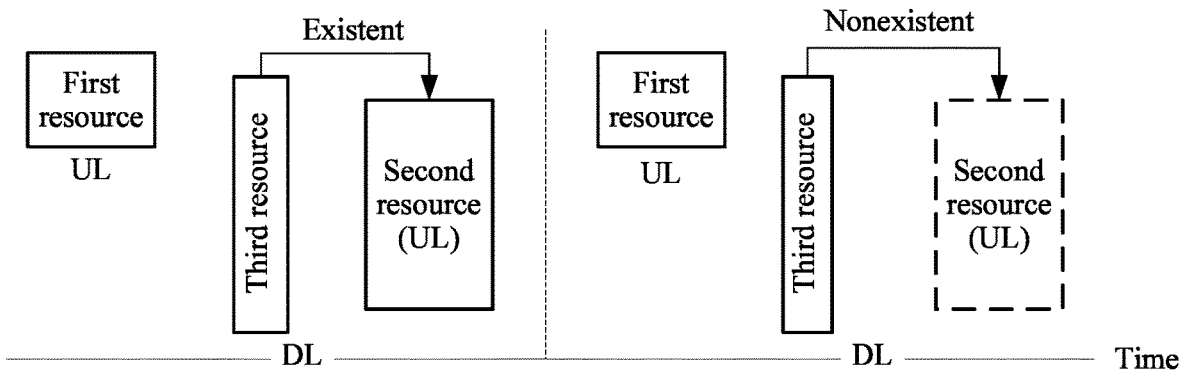
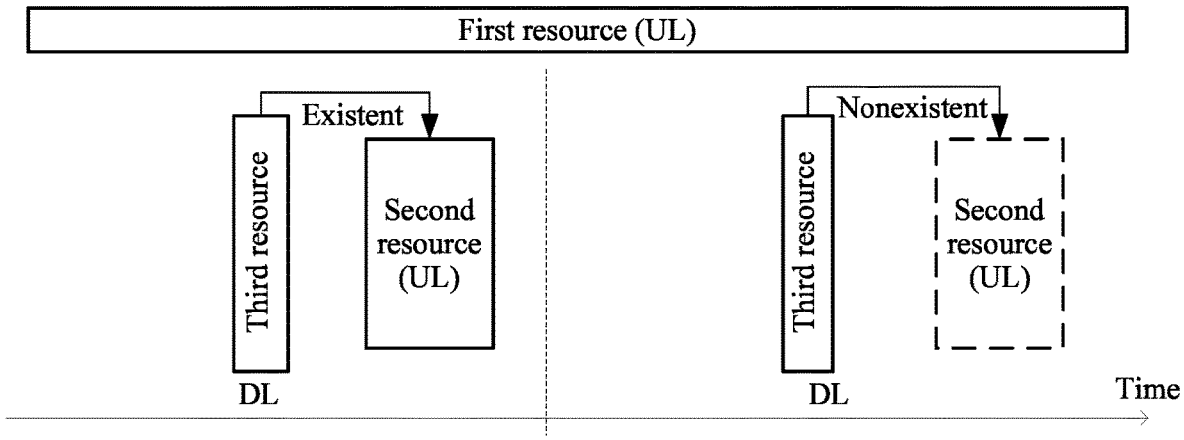
FIG. 6
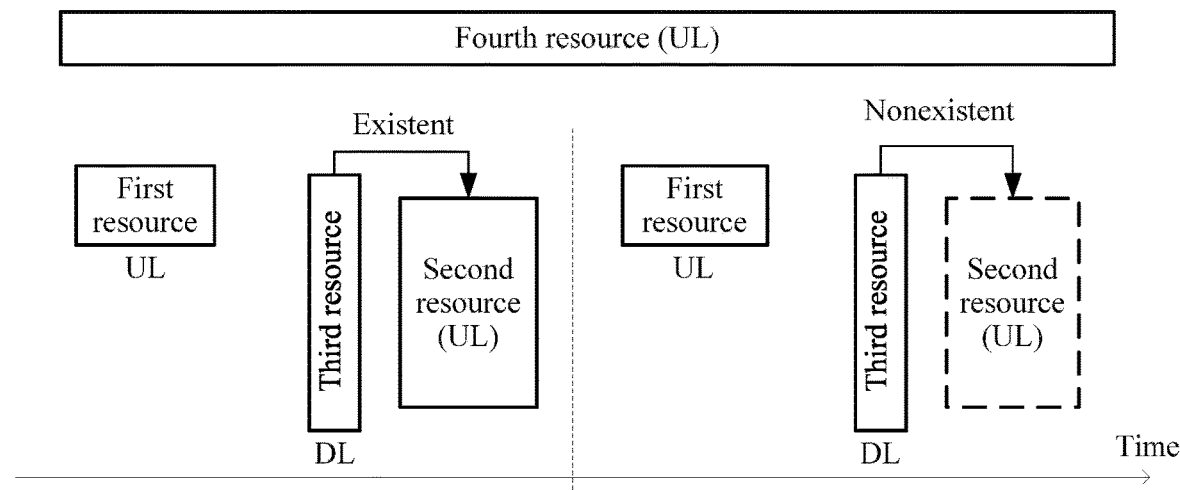
FIG. 7

Time domain sub resources included in a first resource

| ... | Sub resource 1 | Sub resource 2 | Sub resource 3 | Sub resource 4 | ... |

⋮

Frequency domain sub resources included in a first resource

⋮

| Sub resource 1 |
| Sub resource 2 |
| Sub resource 3 |
| Sub resource 4 |

⋮

Time domain and frequency domain sub resources included in a first resource

⋮

| | Sub resource 1 | Sub resource 2 | |
|---|---|---|---|
| ... | Sub resource 3 | Sub resource 4 | ... |
| | Sub resource 5 | Sub resource 6 | |
| | Sub resource 7 | Sub resource 8 | |

First resource 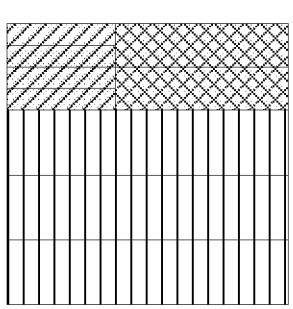  Second resource 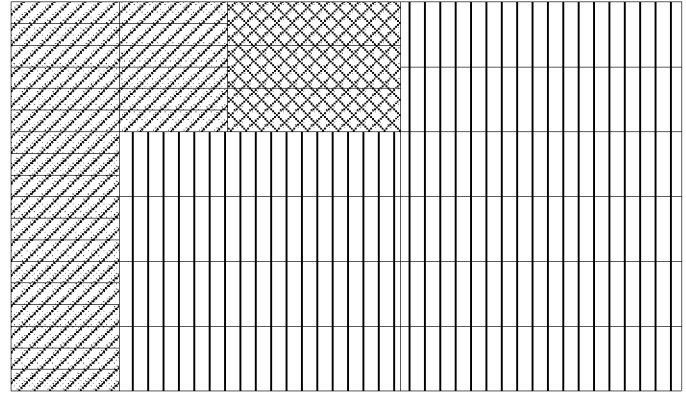

FIG. 10

INFORMATION TRANSMISSION METHOD AND APPARATUS

CROSS-REFERENCE TO RELATED APPLICATIONS

This application is a U.S. National Stage of International Patent Application No. PCT/CN2017/093946 filed on Jul. 21, 2017, which claims priority to Chinese Patent Application No. 201710359142.0 filed on May 19, 2017. Both of the aforementioned applications are hereby incorporated by reference in their entireties.

TECHNICAL FIELD

Embodiments of this application relate to the communications field, and more specifically, to an information transmission method and apparatus in the communications field.

BACKGROUND

Currently, a grant-free (Grant-free)-based grant-free transmission mode is known, or is referred to as a scheduling-free transmission mode. In this transmission mode, a network device allocates a preconfigured (for example, configured in a semi-static mode) grant-free resource to a terminal device. When performing uplink transmission, the terminal device does not need to send a scheduling request (Scheduling Request, SR) to the network device and wait for the network device to send uplink grant (Up Link Grant, UL Grant) information, but can directly send uplink data in the grant-free transmission mode, thereby reducing a transmission latency and reducing signaling overheads.

In the prior art, based on a feature of the grant-free transmission mode, the network device does not know an action of the terminal device in advance. For example, the network device does not determine when the terminal device sends data, how many terminal devices need to send data, and how many pieces of data the terminal device needs to send. Therefore, when configuring a grant-free resource, a system cannot determine a size of the grant-free resource. With respect to a preconfigured grant-free resource, if few terminal devices transmit data in the grant-free transmission mode, resource waste is caused due to a large quantity of idle resources. If a large quantity of terminal devices transmit data in the grant-free transmission mode, a severe collision occurs between data of different terminal devices. This greatly reduces transmission performance of the grant-free transmission mode. Obviously, this mode of preconfiguring a grant-free resource is not flexible.

Therefore, a technology needs to be provided to improve resource configuration flexibility.

SUMMARY

Embodiments of this application provide an information transmission method to improve resource configuration flexibility.

According to a first aspect, an information transmission method is provided, where the method includes: determining, by a network device, first indication information, where the first indication information is used to indicate a configuration of a second resource, the second resource is used to transmit retransmission data including retransmission data of first data, the first data is data sent by a first terminal device by using a first resource unit, the first resource unit belongs to a preconfigured first resource, the first resource and the second resource are both grant-free resources and are different from each other, and the first indication information is determined by the network device based on a receiving status of the first data and sending, by the network device, the first indication information.

According to the information transmission method in this embodiment of this application, the first resource used to transmit the data and the second resource used to transmit the retransmission data are set. Therefore, the network device can send, to the terminal device based on the receiving status of the data on the first resource, the first indication information used to indicate the configuration of the second resource. Therefore, the terminal device can determine, based on the first indication information, information related to the second resource. Therefore, when data transmission fails, the terminal device does not send the retransmission data on the original first resource, but can send the retransmission data directly on the second resource. This is equivalent to sending one part of currently transmitted data (that is, the retransmission data) by using the second resource, and sending another part of data (that is, initial transmission data) by using the first resource. A relatively large quantity of resources can increase a possibility of successful data transmission, and improve transmission efficiency. In addition, because the network device adjusts the resource configuration based on the receiving status of the data, resource configuration flexibility is also improved.

With reference to the first aspect, in some implementations of the first aspect, the first indication information is specifically used to indicate whether the network device configures the second resource.

With reference to the first aspect, in some implementations of the first aspect, the first indication information is specifically determined by the network device based on the receiving status of the first data and a receiving status of at least one piece of second data, the at least one piece of second data is carried on at least one resource unit in the first resource other than the first resource unit, the at least one piece of second data corresponds to at least one second terminal device on a one-to-one basis, and each piece of second data is sent by a corresponding second terminal device.

Therefore, the network device determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

With reference to the first aspect, in some implementations of the first aspect, the first indication information is specifically further used to indicate a size of the second resource; and/or the first indication information is specifically further used to indicate a position of the second resource.

With reference to the first aspect, in some implementations of the first aspect, when the first indication information is specifically used to indicate that the network device configures the size of the second resource, the size of the second resource is determined by the network device based on a receiving status of data carried on the first resource.

Therefore, the network device flexibly adjusts the size of the second resource based on the receiving status of the data carried on the first resource, and configures a resource of an appropriate size for the terminal device. This can improve resource utilization while improving data transmission efficiency.

With reference to the first aspect, in some implementations of the first aspect, the first resource includes a plurality of types of resource units, sizes of resource units of any two types are different, and the second resource includes at least one type of resource unit in the plurality of types of resource units, where a quantity of resource units of each type in the second resource is determined by the network device based on a receiving status of data carried on resource units of each type in the first resource.

The plurality of types of resource units are configured for the first resource, and the sizes and/or modulation and coding schemes of the resource units of any two types are different. Therefore, when the network device configures the size of the second resource, the network device can determine a quantity of resource units of a same type in the second resource based on the receiving status of the data carried on the resource units of each type in the first resource. In this way, the first terminal device can determine, based on a size of data that needs to be transmitted and/or a used modulation and coding scheme, an appropriate type of resource unit for sending the data. This can further improve data transmission efficiency.

With reference to the first aspect, in some implementations of the first aspect, before the sending, by the network device, the first indication information, the method further includes:

sending, by the network device, second indication information to the first terminal device, where the second indication information is used to instruct the first terminal device to send the data by using the first resource, and the network device configures the second resource based on the receiving status of the data.

Therefore, when little data is transmitted by using a grant-free resource or data transmission is infrequent, the network device can instruct, by using the second indication information based on a transmission status of current data, the first terminal device to use this embodiment of this application. To be specific, the second indication information is used to instruct the first terminal device to send the data by using the first resource, and the network device configures the second resource based on the receiving status of the data. This can effectively improve resource utilization.

According to a second aspect, an information transmission method is provided, where the method includes:

detecting, by a network device, first transmission request information on a first resource, where the first transmission request information is used to indicate that a first terminal device needs to send data, the first transmission request information is carried on a first resource unit, the first resource unit belongs to a preconfigured first resource, and the first resource is a grant-free resource; and sending, by the network device, first indication information, where the first indication information is used to indicate whether a second resource is configured, the second resource is used to transmit data, the second resource is a grant-free resource, the second resource is different from the first resource, and the first indication information is determined by the network device based on a detection result of the first transmission request information.

According to the information transmission method in this embodiment of this application, the first resource used to send the transmission request information and the second resource used to send the data are set. Therefore, the network device can determine, based on an actual requirement of the terminal device and based on the detection result of the transmission request information sent on the first resource, whether to configure the second resource. Therefore, when the terminal device has a data requirement, the terminal device sends the data by using the second resource configured by the network device; and the network device does not configure the second resource in a time period in which there is no data transmission requirement. This effectively improves resource configuration flexibility.

With reference to the second aspect, in some implementations of the second aspect, when the first indication information is used to indicate the second resource, the first indication information is further used to indicate a size of the second resource; and/or the first indication information is further used to indicate a position of the second resource.

With reference to the second aspect, in some implementations of the second aspect, the size of the second resource is determined by the network device based on the detection result of the transmission request information carried on the first resource.

Therefore, the network device flexibly adjusts the size of the second resource based on the detection status of the transmission request information carried on the first resource, and configures the second resource of the appropriate size for the terminal device. This can improve resource utilization while improving data transmission efficiency.

With reference to the second aspect, in some implementations of the second aspect, the first resource includes a plurality of types of resource units, and data types of data indicated by transmission request information carried on resource units of any two types in the first resource are different:

the second resource includes at least one type of resource unit, sizes of resource units of any two types in the at least one type of resource unit in the second resource are different, the at least one type of resource unit in the second resource corresponds to at least one type of resource unit in the first resource on a one-to-one basis, the at least one type of resource unit in the first resource belongs to the plurality of types of resource units in the first resource, each type of resource unit in the second resource corresponds to a data type of data indicated by transmission request information carried on a corresponding resource unit in the first resource, the data type is used to indicate a size of a corresponding resource unit in the second resource, and/or the data type is used to indicate a modulation and coding scheme of data carried on a corresponding resource unit in the second resource; and a quantity of resource units of each type in the second resource is determined by the network device based on a detection result of transmission request information carried on a corresponding resource unit in the first resource.

The plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the terminal device can determine, based on a size of the data that needs to be transmitted, an appropriate type of resource unit for sending the data on the second resource. This can further improve data transmission efficiency.

With reference to the second aspect, in some implementations of the second aspect, before the sending, by the network device, the first indication information, the method further includes:

sending, by the network device, third indication information, where the third indication information is used to instruct the first terminal device to send the transmission request information by using the first resource, and the network device configures the second resource based on the detection result of the transmission request information.

Therefore, when little data is transmitted by using a grant-free resource or data transmission is infrequent, the network device can instruct, by using the third indication information based on a transmission status of current data, the terminal device to use this embodiment of this application. To be specific, the third indication information is used to instruct the terminal device to send the transmission request information by using the first resource, and the network device configures the second resource based on the detection result of the transmission request information. This can effectively improve resource utilization.

According to a third aspect, an information transmission method is provided, where the method includes:

sending, by a first terminal device, first data on a first resource unit, where the first resource unit belongs to a first resource, and the first resource is a preconfigured grant-free resource;

receiving, by the first terminal device, first indication information, where the first indication information is used to indicate a configuration of a second resource, the second resource is used to transmit retransmission data including retransmission data of the first data, the second resource is a grant-free resource, the second resource is different from the first resource, and the first indication information is determined by a network device based on a receiving status of the first data; and performing, by the first terminal device, data transmission based on the first indication information.

According to the information transmission method in this embodiment of this application, the first resource used to transmit the data and the second resource used to transmit the retransmission data are set. Therefore, the network device can send, to the terminal device based on the receiving status of the data on the first resource, the first indication information used to indicate the configuration of the second resource. Therefore, the terminal device can determine, based on the first indication information, information related to the second resource. Therefore, when data transmission fails, the terminal device does not send the retransmission data on the original first resource, but can send the retransmission data directly on the second resource. This is equivalent to sending one part of currently transmitted data (that is, the retransmission data) by using the second resource, and sending another part of data (that is, initial transmission data) by using the first resource. A relatively large quantity of resources can increase a possibility of successful data transmission, and improve transmission efficiency. In addition, because the network device adjusts the resource configuration based on the receiving status of the data, resource configuration flexibility is also improved.

With reference to the third aspect, in some implementations of the third aspect, the first indication information is specifically used to indicate whether the network device configures the second resource.

With reference to the third aspect, in some implementations of the third aspect, the first indication information is specifically determined by the network device based on the receiving status of the first data and a receiving status of at least one piece of second data, the at least one piece of second data is carried on at least one resource unit in the first resource other than the first resource unit, the at least one piece of second data corresponds to at least one second terminal device on a one-to-one basis, and each piece of second data is sent by a corresponding second terminal device.

Therefore, the network device determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

With reference to the third aspect, in some implementations of the third aspect, the first indication information is specifically further used to indicate a size of the second resource, and/or the first indication information is specifically further used to indicate a position of the second resource.

With reference to the third aspect, in some implementations of the third aspect, when the first indication information is specifically used to indicate that the network device configures the size of the second resource, the size of the second resource is determined by the network device based on a receiving status of data carried on the first resource.

The network device flexibly adjusts the size of the second resource based on the receiving status of the data carried on the first resource, and configures a resource of an appropriate size for the terminal device. This can improve resource utilization while improving data transmission efficiency.

With reference to the third aspect, in some implementations of the third aspect, the first resource includes a plurality of types of resource units, sizes of resource units of any two types are different, and the second resource includes at least one type of resource unit in the plurality of types of resource units, where a quantity of resource units of each type in the second resource is determined by the network device based on a receiving status of data carried on resource units of each type in the first resource.

The plurality of types of resource units are configured for the first resource, and the sizes and/or modulation and coding schemes of the resource units of any two types are different. Therefore, when the network device configures the size of the second resource, the network device can determine a quantity of resource units of a same type in the second resource based on the receiving status of the data carried on the resource units of each type in the first resource. In this way, the first terminal device can determine, based on a size of data that needs to be transmitted and/or a used modulation and coding scheme, an appropriate type of resource unit for sending the data. This can further improve data transmission efficiency.

With reference to the third aspect, in some implementations of the third aspect, before the sending, by a first terminal device, the first data, the method further includes:

receiving, by the first terminal device, second indication information, where the second indication information is used to instruct the first terminal device to send the data by using the first resource, and the network device configures the second resource based on the receiving status of the data.

When little data is transmitted by using a grant-free resource or data transmission is infrequent, the network device can instruct, by using the second indication information based on a transmission status of current data, the first terminal device to use this embodiment of this application. To be specific, the second indication information is used to instruct the first terminal device to send the data by using the first resource, and the network device configures the second resource based on the receiving status of the data. This can effectively improve resource utilization.

According to a fourth aspect, an information transmission method is provided, where the method includes: sending, by a first terminal device, first transmission request information, where the first transmission request information is used to indicate that the first terminal device needs to send data, the first transmission request information is carried on a first resource unit, the first resource unit belongs to the first resource, and the first resource is a preconfigured grant-free resource:

receiving, by the first terminal device, first indication information, where the first indication information is used to indicate whether a second resource is configured, the second resource is used to transmit data, the second resource is a grant-free resource, the second resource is different from the first resource, and the first indication information is determined by the network device based on a detection result of the first transmission request information; and performing, by the first terminal device, data transmission based on the first indication information.

According to the information transmission method in this embodiment of this application, the first resource used to send the transmission request information and the second resource used to send the data are set. Therefore, the network device can determine, based on an actual requirement of the terminal device and based on the detection result of the transmission request information sent on the first resource, whether to configure the second resource. Therefore, when the terminal device has a data requirement, the terminal device sends the data by using the second resource configured by the network device; and the network device does not configure the second resource in a time period in which there is no data transmission requirement. This effectively improves resource configuration flexibility.

With reference to the fourth aspect, in some implementations of the fourth aspect, when the first indication information is used to indicate that the second resource is configured, the first indication information is further used to indicate a size of the second resource; and/or the first indication information is further used to indicate a position of the second resource.

With reference to the fourth aspect, in some implementations of the fourth aspect, the size of the second resource is determined by the network device based on the detection result of the transmission request information carried on the first resource.

Therefore, the network device flexibly adjusts the size of the second resource based on the detection status of the transmission request information carried on the first resource, and configures the second resource of the appropriate size for the terminal device. This can improve resource utilization while improving data transmission efficiency.

With reference to the fourth aspect, in some implementations of the fourth aspect, the first resource includes a plurality of types of resource units, and data types of data indicated by transmission request information carried on resource units of any two types in the first resource are different;

the second resource includes at least one type of resource unit, sizes of resource units of any two types in the at least one type of resource unit in the second resource are different, the at least one type of resource unit in the second resource corresponds to at least one type of resource unit in the first resource on a one-to-one basis, the at least one type of resource unit in the first resource belongs to the plurality of types of resource units in the first resource, each type of resource unit in the second resource corresponds to a data type of data indicated by transmission request information carried on a corresponding resource unit in the first resource, the data type is used to indicate a size of a corresponding resource unit in the second resource, or the data type is used to indicate a modulation and coding scheme of data carried on a corresponding resource unit in the second resource, and a quantity of resource units of each type in the second resource is determined by the network device based on a detection result of transmission request information carried on a corresponding resource unit in the first resource.

The plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the terminal device can determine, based on a size of the data that needs to be transmitted, an appropriate type of resource unit for sending the data on the second resource. This can further improve data transmission efficiency.

With reference to the fourth aspect, in some implementations of the fourth aspect, before the sending, by a first terminal device, the first transmission request information, the method further includes:

receiving, by the first terminal device, third indication information, where the third indication information is used to instruct the first terminal device to send the transmission request information by using the first resource, and the network device configures the second resource based on the detection result of the transmission request information.

Therefore, when little data is transmitted by using a grant-free resource or data transmission is infrequent, the network device can instruct, by using the third indication information based on a transmission status of current data, the terminal device to use this embodiment of this application. To be specific, the third indication information is used to instruct the terminal device to send the transmission request information by using the first resource, and the network device configures the second resource based on the detection result of the transmission request information. This can effectively improve resource utilization.

According to a fifth aspect, an information transmission apparatus is provided, where the apparatus may be configured to perform an operation of the network device in the first aspect and any possible implementation of the first aspect. Specifically, the apparatus may include a module/unit configured to perform the operation of the network device in the first aspect or any possible implementation of the first aspect.

According to a sixth aspect, an information transmission apparatus is provided, where the apparatus may be configured to perform an operation of the network device in the second aspect and any possible implementation of the second aspect. Specifically, the apparatus may include a module/unit configured to perform the operation of the network device in the second aspect or any possible implementation of the second aspect.

According to a seventh aspect, an information transmission apparatus is provided, where the apparatus may be configured to perform an operation of the first terminal device in the third aspect and any possible implementation of the third aspect. Specifically, the apparatus may include a module/unit configured to perform the operation of the first terminal device in the third aspect or any possible implementation of the third aspect.

According to an eighth aspect, an information transmission apparatus is provided, where the apparatus may be configured to perform an operation of the first terminal device in the fourth aspect and any possible implementation of the fourth aspect. Specifically, the apparatus may include a module/unit configured to perform the operation of the first terminal device in the fourth aspect or any possible implementation of the fourth aspect.

According to a ninth aspect, a network device is provided, where the network device includes a processor, a transceiver, and a memory. The processor, the transceiver, and the memory communicate with each other by using an internal connecting channel. The memory is configured to store an instruction, and the processor is configured to execute the instruction stored in the memory. When the processor executes the instruction stored in the memory, the execution enables the network device to perform the method in the first aspect or any possible implementation of the first aspect, or the execution enables the network device to implement the apparatus provided by the fifth aspect.

According to a tenth aspect, a network device is provided, where the network device includes a processor, a transceiver, and a memory. The processor, the transceiver, and the memory communicate with each other by using an internal connecting channel. The memory is configured to store an instruction, and the processor is configured to execute the instruction stored in the memory. When the processor executes the instruction stored in the memory, the execution enables the network device to perform the method in the second aspect or any possible implementation of the second aspect, or the execution enables the network device to implement the apparatus provided by the sixth aspect.

According to an eleventh aspect, a terminal device is provided, where the terminal device includes a processor, a transceiver, and a memory. The processor, the transceiver, and the memory communicate with each other by using an internal connecting channel. The memory is configured to store an instruction, and the processor is configured to execute the instruction stored in the memory. When the processor executes the instruction stored in the memory, the execution enables the terminal device to perform the method in the third aspect or any possible implementation of the third aspect, or the execution enables the terminal device to implement the apparatus provided by the seventh aspect.

According to a twelfth aspect, a terminal device is provided, where the terminal device includes a processor, a transceiver, and a memory. The processor, the transceiver, and the memory communicate with each other by using an internal connecting channel. The memory is configured to store an instruction, and the processor is configured to execute the instruction stored in the memory. When the processor executes the instruction stored in the memory, the execution enables the terminal device to perform the method in the fourth aspect or any possible implementation of the fourth aspect, or the execution enables the terminal device to implement the apparatus provided by the eighth aspect.

According to a thirteenth aspect, a system on chip is provided and includes a memory and a processor, where the memory is configured to store a computer program, and the processor is configured to invoke and run the computer program in the memory, so that a communications device in which the system on chip is installed performs the method in any one of the first aspect to the fourth aspect and implementations thereof.

According to a fourteenth aspect, a computer program product is provided, where the computer program product includes computer program code, and when executed by a communications unit, a processing unit, a transceiver, or a processor of a communications device (for example, a network device or a terminal device), the computer program code enables the communications device to perform the method in any one of the first aspect to the fourth aspect and implementations thereof.

According to a fifteenth aspect, a computer-readable storage medium is provided, where the computer-readable storage medium stores a program, and the program enables a communications device (for example, a network device or a terminal device) to perform the method in any one of the first aspect to the fourth aspect and implementations thereof.

In some of the foregoing implementations, when the network device detects the first data and the at least one piece of second data, and the receiving status of the first data and the receiving status of the at least one piece of second data satisfy a preset condition, the first indication information is used to indicate that the network device configures the second resource.

In some of the foregoing implementations, when the network device detects the first data, the first indication information is used to indicate that the second resource is configured.

In some of the foregoing implementations, the first resource is used to transmit the initial transmission data.

BRIEF DESCRIPTION OF DRAWINGS

FIG. 6 is a schematic structural diagram of a first resource, a second resource, and a third resource according to an embodiment of this application;

FIG. 7 is a schematic structural diagram of a first resource, a second resource, a third resource, and a fourth resource according to another embodiment of this application;

FIG. 9 is a schematic structural diagram of a first resource according to another embodiment of this application:

FIG. 10 and FIG. 11 are schematic structural diagrams of a first resource and a second resource according to another embodiment of this application:

DESCRIPTION OF EMBODIMENTS

Figure 1:
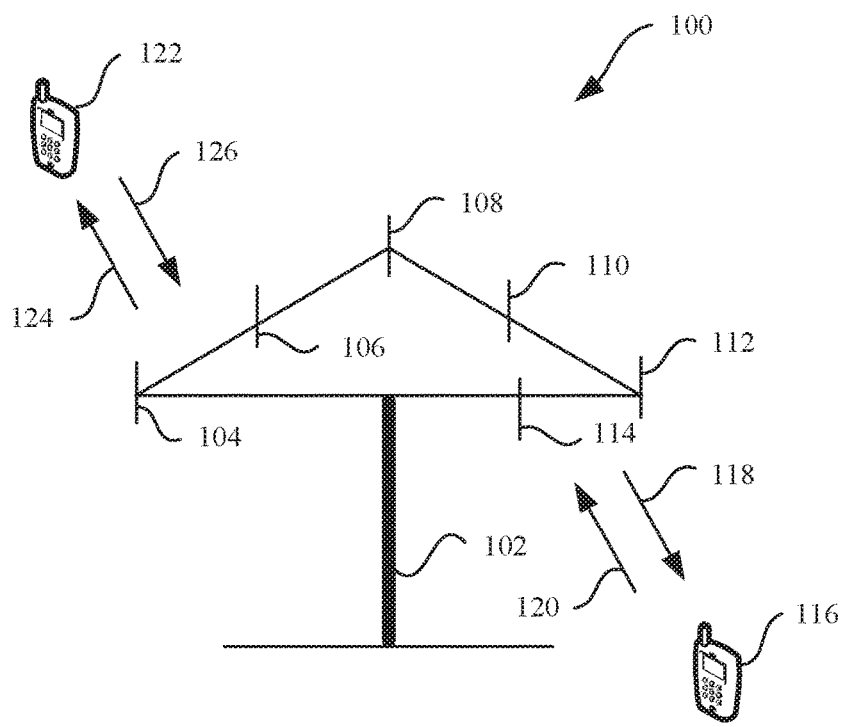
FIG. 1 is a schematic diagram of a communications system to which an embodiment of this application is applied.

The following describes technical solutions of embodiments of this application with reference to accompanying drawings.

The technical solutions of the embodiments of this application may be applied to various communications systems, such as a global system for mobile communications (Global System of Mobile Communications, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, a terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

A network device in the embodiments of this application may be a device configured to communicate with a terminal device. The network device may be a base transceiver station (base transceiver station, BTS) in a global system for mobile communications (Global System of Mobile Communications, GSM) system or a code division multiple access (Code Division Multiple Access, CDMA) system, or may be a NodeB (NodeB, NB) in wideband code division multiple access (Wideband Code Division Multiple Access, WCDMA), or may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay station, an access point, an in-vehicle device, a wearable device, a network device in a future 5G network, a network device in a future evolved PLMN network, or the like. This is not limited in the embodiments of this application.

FIG. 1 is a schematic diagram of a communications system to which an embodiment of this application is applied. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. It may be understood by a person of ordinary skill in the art that both the transmitter chain and the receiver chain may include a plurality of components related to signal transmission and reception (such as a processor, a modulator, a multiplexer, a demodulator, a demultiplexer, or an antenna).

The network device 102 may communicate with a plurality of terminal devices (such as a terminal device 116 and a terminal device 122). However, it may be understood that, the network device 102 can communicate with any quantity of terminal devices similar to the terminal device 116 or 122. For example, the terminal devices 116 and 122 may be cellular phones, smartphones, portable computers, handheld communications devices, handheld computing devices, satellite radio apparatuses, global positioning systems, PDAs, and/or any other appropriate devices that are configured to perform communication in the wireless communications system 100.

As shown in FIG. 1, the terminal device 116 communicates with the antennas 112 and 114, where the antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (Frequency Division Duplex, FDD) system, for example, the forward link 118 may use a frequency band different from that used by the reverse link 120, and the forward link 124 may use a frequency band different from that used by the reverse link 126.

For another example, in a time division duplex (Time Division Duplex, TDD) system or a full duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or an area that are/is designed for communication are/is referred to as a sector of the network device 102. For example, an antenna group may be designed to communicate with a terminal device in a sector of a coverage area of the network device 102. In a process in which the network device 102 communicates with the terminal devices 116 and 122 respectively by using the forward links 118 and 124, transmit antennas of the network device 102 may use beamforming to increase signal-to-noise ratios of the forward links 118 and 124. In addition, in contrast to a manner in which a network device uses a single antenna to transmit signals to all terminal devices served by the network device, when the network device 102 uses beamforming to transmit signals to the terminal devices 116 and 122 that are distributed randomly in a related coverage area, mobile devices in a neighboring cell receive less interference.

At a given time, the network device 102, the terminal device 116, or the terminal device 122 may be a wireless communications sending apparatus and/or a wireless communications receiving apparatus. When sending data, the wireless communications sending apparatus may encode the data for transmission.

Specifically, the wireless communications sending apparatus may obtain (for example, generate, receive from another communications apparatus, or store in a memory) a quantity of data bits that need to be sent to a wireless communications receiving apparatus by using a channel. The data bits may be included in a transport block (or a plurality of transport blocks) of the data, and the transport block may be segmented to generate a plurality of code blocks.

In addition, the communications system 100 may be a public land mobile network (Public Land Mobile Network, PLMN) network, a D2D network, an M2M network, or another network. FIG. 1 is merely a simplified schematic diagram of an example. The network may further include another network device, which is not shown in FIG. 1.

In this embodiment of this application, a resource used by the communications system 100 may be a grant-free resource. In other words, in this embodiment of this application, various communications devices (for example, network devices or terminal devices) in the communications system 100 may use resources in a grant-free transmission mode for communication.

The following describes the grant-free transmission mode in detail in this embodiment of this application. In this embodiment of this application, it may be understood that the grant-free transmission mode has any one or more of the following meanings, or a combination of some technical features in a plurality of meanings, or other similar meanings:

Grant-free transmission may mean: the network device pre-allocates and notifies a plurality of transmission resources to the terminal device; when the terminal device has an uplink data transmission requirement, the terminal device selects at least one transmission resource from the plurality of transmission resources pre-allocated by the network device, and uses the selected transmission resource to send uplink data; and the network device detects, on one or more of the plurality of transmission resources pre-allocated by the network device, the uplink data sent by the terminal device. The detection may be blind detection, or may be detection performed based on a control field in the uplink data, or is detection performed in another manner.

The grant-free transmission may mean that the network device pre-allocates and notifies a plurality of transmission resources to the terminal device, so that when the terminal device has an uplink data transmission requirement, the terminal device selects at least one transmission resource from the plurality of transmission resources pre-allocated by the network device and uses the selected transmission resource to send uplink data.

The grant-free transmission may mean obtaining information about a plurality of pre-allocated transmission resources, selecting at least one transmission resource from the plurality of transmission resources when there is an uplink data transmission requirement, and using the selected transmission resource to send uplink data. An obtaining manner may be obtaining from the network device.

The grant-free transmission may be a method for uplink data transmission of the terminal device that can be implemented without dynamic scheduling by the network device, where the dynamic scheduling may be a scheduling mode in which the network device indicates a transmission resource for each uplink data transmission of the terminal device by using signaling. Optionally, implementing uplink data transmission of the terminal device may be understood as allowing uplink data transmission of two or more terminal devices on a same time-frequency resource. Optionally, the transmission resource may be a resource for transmission on one or more resource units after a time of receiving the signaling by the terminal device. A resource unit may be a smallest resource unit at a time of transmission. For example, when the resource unit is a time domain unit used to denote a time domain resource, the resource unit may be a TTI whose value may be 1 ms, or 0.5 ms, or 2 symbols, or may be another preset time unit.

The grant-free transmission may mean that the terminal device performs uplink data transmission without requiring a grant from the network device. The grant may mean: the terminal device sends an uplink scheduling request to the network device; and after receiving the scheduling request, the network device sends an uplink grant to the terminal device, where the uplink grant indicates an uplink transmission resource allocated to the terminal device.

The grant-free transmission may be a contention transmission mode, and may specifically mean that a plurality of terminals perform uplink data transmission simultaneously on a pre-allocated same time-frequency resource, without requiring a grant from the network device.

It may be understood that, the grant-free resource described hereinafter represents a resource that is configured by the network device and is not exclusively used by any terminal device. To be specific, a terminal device sends data on one or more resource units in a resource shared by a plurality of terminal devices; in addition, the terminal device may select a resource unit from a preconfigured resource in a contention mode to send data. For example, the terminal device randomly selects a resource unit from the preconfigured resource to send data, and the network device configures a grant-free resource for the terminal device, but does not indicate a specific resource unit to be used by the terminal device for transmission on the grant-free resource. The resource unit to be selected by the terminal device is determined by the terminal device itself.

In this embodiment of this application, detecting data or information by the network device may be blind detection, where the blind detection may be understood as detecting data that may arrive when arrival of the data cannot be predicted. Blind detection may also be understood as detection without an explicit signaling indication.

In this embodiment of this application, the transmission resource may include one of the following resources or a combination thereof:

α—a time domain resource (which may also be referred to as a time resource), for example, a radio frame, a subframe, or a symbol;

β—a frequency domain resource (which may also be referred to as a spectrum resource), for example, a subcarrier or a resource block;

γ—a spatial domain resource, for example, a transmit antenna or a beam;

θ—a code domain resource, for example, a sparse code multiple access (Sparse Code Multiple Access, SCMA) codebook, a low density signature (Low Density Signature, LDS) sequence, or a CDMA code; and δ—an uplink pilot resource.

In some of the embodiments of this application, there may be a plurality of (two or more) terminal devices, and each terminal device autonomously selects a grant-free resource based on the grant-free transmission mode to send uplink data to the network device.

Figure 2:
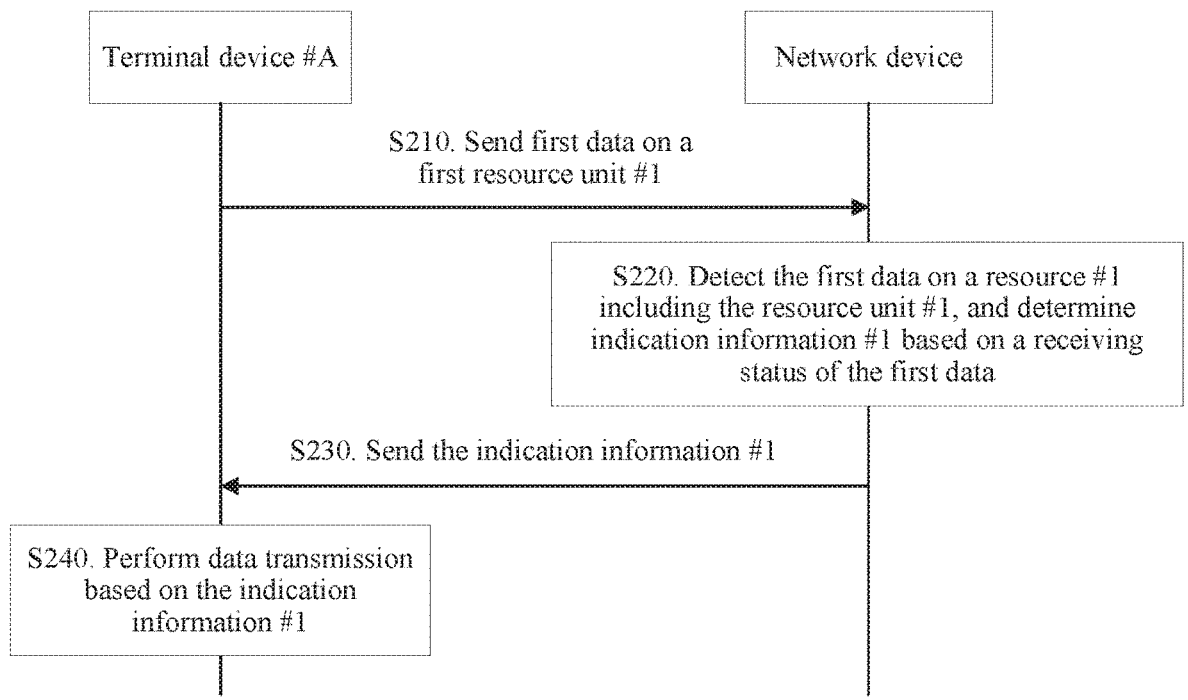
FIG. 2 is a schematic interaction diagram of an information transmission method according to an embodiment of this application.
Figure 3:
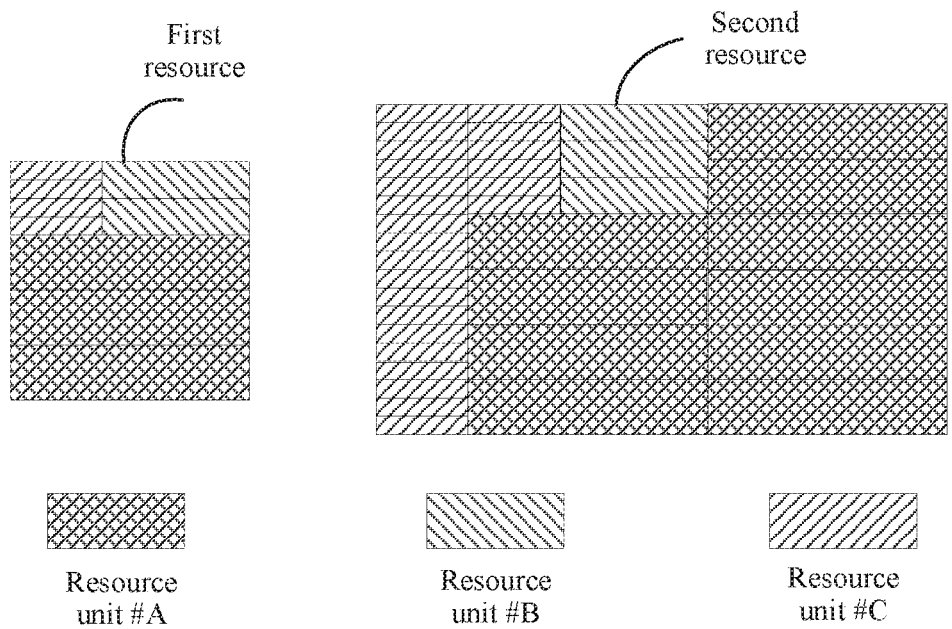
FIG. 3 is a schematic structural diagram of a first resource and a second resource according to another embodiment of this application.

The following describes an information transmission method in an embodiment of this application in detail with reference to FIG. 2 and FIG. 3.

First, an information transmission process according to an embodiment of this application is described in detail with reference to FIG. 2. FIG. 2 is a schematic interaction diagram of an information transmission method according to an embodiment of this application.

Optionally, the network device may be a base station.

This embodiment of this application may be applied to a communications system including a network device and at least one terminal device. With losing generality, the following uses the network device and a first terminal device in the at least one terminal device, and interaction between the network device and a terminal device #A (that is, an example of the first terminal device) as an example to describe in detail the information transmission method according to this embodiment of this application.

As shown in FIG. 2, in S210, the terminal device #A sends first data on a resource unit #1 (that is, an example of a first resource unit), where the resource unit #1 belongs to a resource #1 (that is, an example of a first resource), and the resource #1 is a preconfigured grant-free resource.

Specifically, the resource #1 is preconfigured in a system, and the resource #1 is a grant-free resource. The terminal device #A selects a resource unit (for example, the resource unit #1) from the resource #1 in a contention mode (to be specific, the terminal device #A and another terminal device simultaneously select a resource unit from the resource #1) to send the first data.

The resource #1 is a periodic resource. For example, a size, a position, and a period of the resource #1 are configured by using higher layer signaling or predefined in a standard. In a special example, the resource #1 is a frequency band. To be specific, the frequency band is used as the resource #1 dedicated for grant-free transmission.

In this embodiment of this application, the resource unit is a basic transmission unit for transmitting data or information. For example, if the resource #1 is a time domain resource, the resource unit is a time unit, where a length of each time unit may be one TTI, one slot, one mini-slot (Mini-slot), or the like; if the resource #1 is a frequency domain resource, the resource unit may be a subcarrier or the like; or if the resource #1 is a time-frequency resource, the resource unit may be a resource element (Resource Element, RE), or may be a resource block (Resource Block, RB), or the like.

It should be understood that, in this embodiment of this application, the resource #1 and a resource #2 described hereinafter may be resources in a same dimension, or may be resources in different dimensions.

For example, the resource #1 is a time domain resource, and the resource #2 may be a frequency domain resource, or may be a time-frequency resource, or may be a code domain resource.

For another example, the resource #1 is a frequency domain resource, and the resource #2 may be a frequency domain resource, or may be a time-frequency resource, or may be a code domain resource.

In S220, the network device detects the first data on the resource #1, and determines indication information #1 (that is, an example of the first indication information) based on a receiving status of the first data, where the indication information #1 is used to indicate a configuration of the resource #2, the resource #2 is used to transmit retransmission data including retransmission data of the first data, and both the resource #2 and the resource #1 are grant-free resources.

Specifically, the resource #2 is used to transmit retransmission data, and the resource #1 may be used to transmit initial transmission data or may be used to transmit retransmission data. To be specific, the first data may be initial transmission data, or may be retransmission data.

The following describes the retransmission data of the first data in three possible cases:

The retransmission data of the first data is a repetition version of the first data. To be specific, the retransmission data of the first data is completely the same as the first data. To be specific, a redundancy version (Redundancy Version, RV) number of the retransmission data of the first data is the same as a redundancy version of the first data. For example, both are RV0.

The retransmission data of the first data is a retransmission version of the first data. To be specific, the redundancy version number of the retransmission data of the first data is different from the redundancy version number of the first data. For example, the redundancy version number of the first data is RV0, and the redundancy version number of the retransmission data of the first data is RV1 or RV2.

The retransmission data of the first data, transmitted on the second resource, includes both a repetition version of the first data, and a retransmission version of the first data. For example, the redundancy version number of the first data is RV0, and the retransmission data of the first data is transmitted on the second resource for three times, respectively corresponding to redundancy version numbers RV0, RV2, and RV2. Obviously, both the repetition version of the first data, and the retransmission version of the first data are included. It should be understood that, what is transmitted by the terminal device #A on the second resource each time is a repetition version of a previous transmission version, or is a retransmission version of a previous transmission version, but cannot be both the repetition version and the retransmission version of the previous transmission version.

In addition, the resource #2 is also a grant-free resource. The resource #2 may be determined by the network device based on the receiving status of the data on the resource #1 from a plurality of grant-free resources (possibly not available in current transmission) used to transmit retransmission data and preconfigured in the system, or may be dynamically determined by the network device directly based on the receiving status of the data on the resource #1. This is not limited in this embodiment of this application.

In addition, in this embodiment of this application, in some cases, the resource #2 may also be used to transmit initial transmission data. For example, when the terminal device #A has data to be sent, and the network device sends the indication information #1 based on the receiving status of the data on the resource #1, and the terminal device #A detects or receives that the network device exactly configures the resource #2 by using the indication information #1, initial transmission data may be directly transmitted on the resource #2.

In this embodiment of this application, the configuration of the resource #2 may include existence (that is, whether the network device configures the resource #2) of the resource #2, a size of the resource #2, a position of the resource #2, or the like. The configuration is described in detail hereinafter.

Herein it should be noted that, without losing generality, the receiving status of the first data by the network device is used as an example. The receiving status of the data in this embodiment of this application indicates whether reception of the first data by the network device succeeds or fails. That reception of the first data fails indicates that the network device can detect existence of the first data on the resource unit #1 carrying the first data on the resource #1, for example, received power on the resource unit #1 is greater than a first threshold, or detect sending of a device identity (for example, an ID of the terminal device #A) of the terminal device #A, but does not demodulate and decode the first data correctly, and therefore, reception of the first data fails.

In addition, it should be noted that, that the network device detects the device identity of the terminal device #A but does not correctly decode the data occurs during transmission of the first data in a case in which the device identity is indicated explicitly or implicitly. For example, the device identity is indicated by using a demodulation reference signal (Demodulation Reference Signal. DMRS), or data corresponding to the first data includes a control part and a data part that are independent, and the control part includes the device identity. In this case, the network device may successfully detect the device identity but does not decode the data.

It should be understood that, detecting data in this embodiment of this application may also be understood as detecting a resource unit carrying the data.

In this embodiment of this application, the network device may determine the indication information #1 based on the receiving status of the first data in two manners: a manner 1 and a manner 2.

Manner 1

The network device determines the indication information #1 only based on the receiving status of the first data.

In this case, the network device directly determines the indication information #1 only when reception of the first data fails, and the indication information #1 is used to indicate that the resource #2 is configured.

Manner 2

Optionally, the indication information #1 is specifically determined by the network device based on the receiving status of the first data and a receiving status of at least one piece of second data, the at least one piece of second data is carried on at least one resource unit in the resource #1 other than the resource unit #1, the at least one piece of second data corresponds to at least one terminal device #B on a one-to-one basis, and each piece of second data is sent by a corresponding terminal device #B.

To be specific, the network device not only determines the indication information #1 based on the receiving status of the first data, but also needs to determine the indication information #1 based on a receiving status of data sent by another terminal device.

Further, in S230, the network device sends the indication information #1 to the terminal device #A. Therefore, the terminal device can perform data transmission based on the indication information #1.

Specifically, the indication information #1 is only a factor used by the terminal device for data transmission. The terminal device #A further needs to comprehensively determine, based on feedback information for indicating whether the first data is successfully received, whether data sent by the terminal device is initial transmission data or retransmission data.

For example, the indication information #1 indicates that the resource #2 is configured. This means that the terminal device #A may send the retransmission data on the resource #2 based on the indication information #1. In addition, the terminal device #A determines, based on the feedback information about the first data, whether the first data is successfully received by the network device. If the network device successfully receives the first data, it means that the terminal device #A may subsequently send new initial transmission data, and in this case, does not need to send the retransmission data of the first data on the resource #2, but continues to send the new initial transmission data on the resource #1. If the network device fails to receive the first data, it means that the terminal device #A needs to subsequently send the retransmission data of the first data, and in this case, the terminal device #A may directly send the retransmission data on the resource #2.

In the prior art, because a terminal device transmits data by using a grant-free resource (that is, the resource #1), a plurality of terminal devices contend for a resource based on a contention mode, and unavoidably send data on a same resource unit, especially when the size of the resource #1 is relatively small. It is more possible that data of different terminal devices is carried on a same resource unit. Therefore, a severe collision occurs during data, transmission, and transmission efficiency is reduced greatly. In this case, if retransmission data of data that is not successfully transmitted continues to be sent on the resource #1, transmission efficiency is not improved. A worst case is that most data is not successfully transmitted.

According to the information transmission method in this embodiment of this application, the first resource used to transmit the data and the second resource used to transmit the retransmission data are set. Therefore, the network device can send, to the terminal device based on the receiving status of the data on the first resource, the first indication information used to indicate the configuration of the second resource. Therefore, the terminal device can determine, based on the first indication information, information related to the second resource. Therefore, when data transmission fails, the terminal device does not send the retransmission data on the original first resource, but can send the retransmission data directly on the second resource. This is equivalent to sending one part of currently transmitted data (that is, the retransmission data) by using the second resource, and sending another part of data (that is, the initial transmission data) by using the first resource. A relatively large quantity of resources can increase a possibility of successful data transmission, and improve transmission efficiency. In addition, because the network device adjusts the resource configuration based on the receiving status of the data resource configuration flexibility is also improved.

In this embodiment of this application, three cases may exist for the configuration of the resource #2. The following further describes actions of the terminal device #A and the network device in detail based on the three cases of the resource #2.

Case A

In step S220, regardless of what the receiving status of the first data by the network device is, the network device configures the resource #2. In step S240, whether the terminal device #A needs to use the resource #2 may be further determined based on the feedback information (denoted as feedback information #1 for ease of distinguishing and understanding) for indicating whether the first data is successfully received.

For example, if the indication information #1 indicates that the resource #2 is configured, and the terminal device #A determines, based on the feedback information #1, that the receiving status of the first data by the network device is receiving failure, the terminal device #A may send the retransmission data of the first data on the resource #2.

For another example, if the indication information #1 indicates that the resource #2 is configured, but the terminal device #A determines, based on the feedback information #1, that the receiving status of the first data by the network device is receiving success, the terminal device #A may send the new initial transmission data on the resource #2.

It should be noted that, in this case, the indication information #1 not only indicates that the resource #2 is configured, but also correspondingly indicates the size of the resource #2 based on the receiving status of the data on the resource #1, but the size of the resource #2 cannot be indicated as 0.

In other words, in this case, the indication information #1 is used to indicate the size of the resource #2, and the size of the resource #2 cannot be 0.

Case B

Optionally, the indication information #1 is specifically used to indicate whether the network device configures the resource #2.

In this case, the network device may determine, based on an actual receiving status of the data, whether to configure the resource #2 for the terminal device #A, and further instruct the terminal device #A by using the indication information #1.

As can be learned from the foregoing description, the network device may determine, based on the manner 1 and the manner 2, whether to configure the resource #2. The following describes the two manners separately.

In the manner 1, the terminal device #A determines the indication information #1 only based on the receiving status of the first data, as described above. In this case, the network device configures the resource #2 only when the first data fails to be received.

In other words, without losing generality, as described above, the terminal device #A is any terminal device, and the first data is data sent by any terminal device. The receiving status of the first data by the network device may be used as a trigger condition. If the network device fails to receive the first data, the resource #2 is configured.

In the manner 2, the network device not only determines, based on the receiving status of the first data, whether to configure the resource #2, but also needs to comprehensively determine, based on the receiving status of the data of the another terminal device, whether to configure the resource #2.

Optionally, when the network device detects the first data and the at least one piece of second data, and the receiving status of the first data and the receiving status of the at least one piece of second data by the network device satisfy a preset condition, the indication information #1 is used to indicate that the resource #2 is configured.

Specifically, the receiving status of the data by the network device may be a quantity of pieces of data that fails to be received, or may be a quantity of resource units on which data fails to be received in the resource #1. The preset condition may be a preset value (denoted as a second threshold for ease of distinguishing and understanding), or may be determined based on a quantity of pieces of data transmitted on the resource #1 within a historical transmission time.

When a quantity of pieces of the first data and the at least one piece of second data that the network device fails to receive is greater than the second threshold, the network device configures the resource #2; otherwise, the resource #2 is not configured.

It should be noted that, the first data and the at least one piece of second data may be a part of data carried on the resource #1, or may be all of data carried on the resource #1.

Therefore, the network device determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

Case C

Optionally, the indication information #1 is specifically further used to indicate the size of the resource #2.

When the network device configures the resource #2, the indication information #1 is specifically further used to indicate the size of the resource #2.

When the network device does not configure the resource #2, the indication information #1 may also be used to indicate the size of the resource #2, but the size of the resource #2 is 0.

The indication information # may indicate the size of the resource #2 by including different content. The following describes the indication information in detail by using an example.

In one case, the network device has preconfigured resources #2 (denoted as a resource set #2 for ease of distinguishing and understanding) of different sizes and corresponding index numbers, or resources #2 of different sizes in a resource set #2 and corresponding index numbers are defined in a standard, where an index number is used to indicate a size of a resource #2. To be specific, mapping relationships between a plurality of resources #2 of different sizes and index numbers exist. In this case, the indication information #1 may indicate, by using the index number, whether the resource #2 exists, and the size of the resource #2 when the resource #2 exists. Therefore, the terminal device #A can determine the size of the resource #2 based on the index number included in the indication information #1.

For example, a value of preset bits in the indication information #1 may be used to indicate the size of the resource #2; and if the value of the preset bits is 0, it indicates that the resource #2 does not exist; if the value of the preset bits is 1, it indicates that the resource #2 exists, that is, the index number corresponding to the resource #2 is 1; or if the value of the preset bits is 2, it indicates that the resource #2 exists, and the index number corresponding to the resource #2 is 2.

In another case, the resource #2 may be dynamically determined by the network device based on the receiving status of the data on the resource #1. In this case, the resource set #2 does not need to be configured by using a higher layer or defined in a standard. In this case, the indication information #1 may directly indicate whether the resource #2 exists, and the size of the resource #2 when the resource #2 exists.

For determining the size of the resource #2, optionally, when the indication information #1 is specifically used to indicate that the network device configures the size of the resource #2, the size of the resource #2 is determined by the network device based on the receiving status of the data carried on the resource #1.

Specifically, the size of the resource #2 may be determined based on all data carried on the resource #1. The following uses a specific embodiment to describe how to determine the size of the resource #2.

In an embodiment, when the resource #1 is a time-frequency resource, the resource #1 may include a plurality of resource units in time domain, frequency domain, or time domain and frequency domain. Assuming that the resource #1 includes N resource units, the network device detects each resource unit in the resource #1, and marks a detected resource unit on which received power is greater than the first threshold (or a device identity is correctly detected) but no data is correctly decoded, as a colliding resource. It is assumed that a quantity of colliding resources in the N resource units is M, where $0<M\leq N$. Therefore, the network device can determine, based on the quantity M of colliding resources or based on a proportion M/N of colliding resources to a total of resource units, the size of the resource #2 that needs to be configured.

For example, it is assumed that $0<\alpha1<\alpha2<\alpha3< \ldots \leq 1$, where a size index of the resource #2 is Si, i=1, 2, 3, . . . , and $S1<S2<S3< \ldots$ . In this case, when $M/N\leq\alpha1$, the size index of the resource #2 configured by the network device is S1; when $\alpha1<M/N\leq\alpha2$, the size index of the resource #2 configured by the network device is S2; when $\alpha2<M/N\leq\alpha3$, the size index of the resource #2 configured by the network device is S3, and so on.

As an example rather than a limitation, the size index of the resource #2 is Si, which may also be replaced with specific time-frequency resource allocation.

It should be understood that, the manner of determining the size of the resource #2 is also applicable to the foregoing case A.

In another embodiment, when the resource #1 is a combination of a time-frequency resource and a code domain resource, the resource #1 may include a plurality of resource units in time domain, frequency domain, or time domain and frequency domain. The terminal device #A may select any one of the resource units, select an orthogonal sequence as a part of first data, and send the first data in a code division mode.

That the terminal device #A sends the first data in a code division mode may be CDMA spread spectrum transmission, or may be non-orthogonal transmission such as SCMA. In this case, a resource unit may be extended to the time domain, frequency domain, or time domain and frequency domain, and an orthogonal sequence is defined as a resource unit. The network device may determine, based on a quantity of resource units detected in the resource #1, that is, a quantity of orthogonal sequences successfully identified by the network device, the size of the resource #2 that needs to be configured.

Specifically, the network device allocates different DMRS sequences to different terminal devices, where different DMRS sequences are used to distinguish different terminal devices. It is assumed that the network device detects N DMRS sequences, but correctly decodes M pieces of data, where M<N. Therefore, the network device can determine, based on M or based on (N−M)/N, the size of the resource #2 that needs to be configured.

For example, it is assumed that $0<\alpha1<\alpha2<\alpha3< \ldots$, where $\alpha$ indicates a ratio of (N−M)/N, the size index of the resource #2 is Si, i=1, 2, 3 . . . , and $S1<S2<S3< \ldots \leq 1$. In this case, when $(N-M)/N\leq\alpha1$, the size index of the resource #2 configured by the network device is S1; when $\alpha1<(N-M)/N\leq\alpha2$, the size index of the resource #2 configured by the network device is S2; when $\alpha2<(N-M)N\leq\alpha3$, the size index of the resource #2 configured by the network device is S3, and so on.

As an example rather than a limitation, the size index of the resource #2 is Si, which may also be replaced with specific time-frequency resource allocation.

Therefore, the network device flexibly adjusts the size of the second resource based on the receiving status of the data carried on the first resource, and configures the second resource of the appropriate size for the terminal device. This can improve resource utilization while improving data transmission efficiency.

In another embodiment, optionally, the resource #1 includes a plurality of types of resource units, sizes of resource units of any two types are different, and the resource #2 includes at least one type of resource unit in the plurality of types of resource units, where a quantity of resource units of each type in the resource #2 is determined by the network device based on a receiving status of data carried on the resource units of each type in the resource #1.

Specifically, the sizes of resource units of any two types in the plurality of types of resource units included in the resource #1 are different, and resource units of different sizes may correspond to different data types, where a data type is used to indicate a size of transmitted data, and a same type of resource unit may correspond to at least one data type. Therefore, the terminal device #A can select an appropriate resource unit based on a data type corresponding to the first data, to send the first data.

The data type is related to a service type of the data. The service type may be a video service, a picture service, a file downloading service, a short message service, a voice service, a social media service, or the like. Therefore, it may also be understood that resource units of different sizes may correspond to different service types.

Further, the network device may determine a quantity of resource units of a same type in the resource #2 based on a receiving status of data carried on resource units of a same type in the resource #1.

In the same way, the terminal device #A can select, based on a size of data that needs to be transmitted currently (or based on a service type of data that needs to be transmitted currently), an appropriate type of resource unit for sending.

It should be noted that, the resource #2 may include at least one type of resource unit in the resource #1. For example, if the resource #1 includes three types of resource units, the resource #2 may include one type, two types, or three types of resource units.

For example, FIG. 3 is a schematic structural diagram of the first resource and the second resource according to another embodiment of this application. As shown in FIG. 3, the resource #1 includes three types of resource units: a resource unit #A, a resource unit #B, and a resource unit #C respectively in ascending order of sizes of the resource units. The resource unit #A corresponds to services that occupy relatively large resources, such as the video service, the picture service, and the file downloading service, the resource unit #B corresponds to services that occupy moderate resources such as the social media service, and the resource unit #C corresponds to services that occupy relatively small resources such as the short message service and the voice service. The three types of resources all carry data sent by different terminal devices. The network device detects data on all the three types of resources in the resource #1 but the data is not correctly received, and the network device configures the resource #2 based on a receiving status of the data. In this case, three types of resource units may be configured for the resource #2. Based on a receiving status of data carried on the resource unit #A in the resource #1, 10 resource units #A are configured for the resource #2; based on a receiving status of data carried on the resource unit #B in the resource #1, 3 resource units #B are configured for the resource #2; and based on a receiving status of data carried on the resource unit #C in the resource #1, 3 resource units #B and 24 resource units #C are configured for the resource #2.

For another example, likewise, the resource #1 includes three types of resource units: a resource unit #A, a resource unit #B, and a resource unit #C respectively. The three types of resources all carry data sent by different terminal devices. The network device detects data on two types of resources in the resource #1 but the data is not incorrectly received, and the network device configures the resource #2 based on a receiving status of the data. In this case, two types of resource units may be configured for the resource #2, and quantities of resource units of different types are determined based on a receiving status of data carried on corresponding resource units in the resource #1.

As described above, the resource #2 may be a resource that is selected from the preconfigured resource set #2 and corresponds to a resource required by current retransmission data, or the size of the resource #2 may be dynamically configured based on the receiving status of the data carried on the resource #1.

The plurality of types of resource units are configured for the first resource, and the sizes of the resource units of any two types are different. Therefore, when the network device configures the size of the second resource, the network device can determine a quantity of resource units of a same type in the second resource based on the receiving status of the data carried on the resource units of each type in the first resource. In this way, the first terminal device can determine, based on a size of data that needs to be transmitted, an appropriate type of resource unit for sending the data. This can further improve data transmission efficiency.

It should be noted that, modulation and coding schemes of the resource units of the two different types may also be different, or both the sizes and modulation and coding schemes are different. Details are not described again. A modulation and coding scheme used by the terminal device for transmission is generally determined based on a channel status. For example, a channel of a terminal device that is relatively close to the network device is generally relatively good, and may use a relatively high order modulation and coding scheme for transmission; and a channel of a terminal device that is relatively far from the network device is generally relatively good, and may use a relatively low order modulation and coding scheme for transmission. The network device does not know in advance how many terminal devices are far from the network device and have data to be transmitted and how many terminal devices are close to the network device and have data to be transmitted. Therefore, based on a receiving status on each type of resource unit in the resource #1, the network device can determine how many corresponding resource units are configured in the resource #2.

Case D

Optionally, the indication information #1 is specifically further used to indicate the position of the resource #2.

To be specific, the resource #2 may be a time domain resource, and the indication information #1 is used to indicate a position of the time domain resource, or indicate allocation of the time domain resource; or the resource #2 may be a frequency domain resource, and the indication information #1 is used to indicate a position of the frequency domain resource, or indicate allocation of the frequency domain resource; or the resource #2 may be a time-frequency resource, and the indication information #1 is used to indicate a position of the time-frequency resource, or indicate allocation of the time-frequency resource.

When the indication information #1 is used to indicate the position of the resource #2, it may also be considered that the indication information #1 indicates the size of the resource #2, because resource allocation of the resource #2 actually implicitly includes the size of the resource #2.

For example, if the resource #2 is a time domain resource, the indication information #1 indicates a start point and a time domain length of the time domain resource, and a unique position of the time domain resource is determined by using the start point and the time domain length of the time domain resource. This is actually equivalent to indicating a size of the time domain resource.

For another example, if the resource #2 is a frequency domain resource, the indication information #1 indicates a start point and a frequency domain width of the frequency domain resource, and a unique position of the frequency domain resource is determined by using the start point and the frequency domain length of the frequency domain resource. This is actually equivalent to indicating a size of the frequency domain resource.

Optionally, a resource #3 used for carrying the indication information #1 is any one of a physical downlink control channel (Physical Downlink Control Channel, PDCCH), a physical hybrid automatic repeat indicator channel (Physical Hybrid ARQ Indicator Channel, PHICH), or a PHICH-like.

Specifically, the resource #3 may be a resource corresponding to the PDCCH. To be specific, the indication information #1 is carried by group downlink control information group common DCI or downlink control information (Downlink Control Information, DCI) located in the resource #3.

Alternatively, the resource #3 may be a PHICH or a PHICH-like (PHICH-like) physical channel, that is, the indication information #1 is carried by the PHICH or the PHICH-like. The PHICH-like may be an extension of the PHICH. This is because after the terminal device #A sends the first data on the resource #1, the terminal device needs to receive the feedback information #1 on the PHICH or the PHICH-like. In this case, the terminal device may receive feedback information for indicating a correct response, or may receive the indication information #1. If the terminal device #A receives the indication information #1, it means that the network device cannot correctly decode the first data. Therefore, the resource #2 is configured to transmit the retransmission data of the data. In other words, the network device may multiplex the feedback information #1 about the first data and the resource #3 to a same resource, that is, perform transmission simultaneously on the PHICH or the PHICH-like.

As an example rather than a limitation, after the network device configures the resource #2, if reception of a quantity of data still fails, or if a transmission collision is still detected on the resource #2, the network device may consecutively configure second resources (another second resource configured after the resource #2 is denoted as a resource #21 for ease of distinguishing and understanding); in addition, a size of the resource #21 may be determined based on a receiving status of the network device on the resource #2. In addition, before each resource #2, the network device may send the indication information #1 by using the resource #3, further indicate that the resource #21 is configured, and indicate a configuration of the resource #2.

The network device may determine the size of the resource #21 based on a receiving status of data carried on the resource #2. A specific determining process is similar to a process of determining the size of the resource #2 based on the receiving status of the data carried on the resource #1. Details are not described again herein for brevity.

Before the network device sends the indication information #1, the method further includes:

the network device sends indication information #2 to the terminal device #A, where the indication information #2 is used to instruct the terminal device #A to send the data by using the resource #1, and the network device configures the resource #2 based on the receiving status of the data.

Specifically, the network device may determine and instruct, based on a data amount of data currently sent or frequency at which data is sent by using a scheduling-free resource, to use this embodiment of this application. To be specific, a mechanism in this embodiment of this application is enabled when little data is transmitted by using a grant-free resource or enabled in a time period in which data transmission by using a grant-free resource is infrequent. In other words, the indication information #2 (that is, second indication information) is used to instruct the terminal device #A to use the resource #A to send the data, and the network device configures the resource #2 based on the receiving status of the data.

More specifically, when little data is transmitted by using the grant-free resource or data transmission is infrequent, the network device indicates, by using the indication information #2, that the terminal device #A may send the data on the resource #1 when sending the data. In addition, the network device configures the resource #2 based on the receiving status of the data on the resource #1.

When more data is transmitted by using the grant-free resource or data transmission is more frequent, the network device also instructs, by using signaling, the terminal device #A not to use this embodiment of this application for data transmission, that is, instructs the terminal device #A to send the data (initial transmission data and/or retransmission data) on a periodic grant-free resource configured by the network device. In addition, the network device does not send the indication information #1 for configuring the resource #2.

In this embodiment of this application, the indication information #2 may be carried by higher layer signaling such as radio resource control (Radio Resource Control, RRC) or a media access control (Media Access Control, MAC) sublayer control element (Control Element, CE), system information (for example, a system information block (System Information Block. SIB)), or other physical layer signaling (for example, the PDCCH).

Actually, in a time period in which data is frequently sent by using a grant-free resource, a large quantity of terminal devices send initial transmission data on the resource #A, but the initial transmission data collides with each other and basically cannot be sent successfully, and actual data transmission basically depends on retransmission data on the resource #2. In this case, from a perspective of resource utilization, the resource #1 and the resource #3 carrying the indication information #1 are wasted. However, in a time period in which little data is sent by using a grant-free resource or data transmission is infrequent, for the data carried on the resource #1, a part of the initial transmission data is transmitted successfully; and a part of the initial transmission data is not transmitted successfully. In this case, the resource #2 is used to send the retransmission data. Therefore, neither the resource #1 nor the resource #3 carrying the indication information #1 is wasted. This can not only improve transmission efficiency, but also improve resource utilization.

Therefore, when little data is transmitted by using a grant-free resource or data transmission is infrequent, the network device can instruct, by using the second indication information based on a transmission status of current data, the first terminal device to use this embodiment of this application. To be specific, the second indication information is used to instruct the first terminal device to send the data by using the first resource, and the network device configures the second resource based on the receiving status of the data. This can effectively improve resource utilization.

According to the information transmission method in this embodiment of this application, in a first aspect, in the information transmission method in this embodiment of this application, the first resource used to transmit the data and the second resource used to transmit the retransmission data are set. Therefore, the network device can send, to the terminal device based on the receiving status of the data on the first resource, the first indication information used to indicate the configuration of the second resource. Therefore, the terminal device can determine, based on the first indication information, information related to the second resource. Therefore, when data transmission fails, the terminal device does not send the retransmission data on the original first resource, but can send the retransmission data directly on the second resource. This is equivalent to sending one part of currently transmitted data (that is, the retransmission data) by using the second resource, and sending another part of data (that is, the initial transmission data) by using the first resource. A relatively large quantity of resources can increase a possibility of successful data transmission, and improve transmission efficiency. In addition, because the network device adjusts the resource configuration based on the receiving status of the data, resource configuration flexibility is also improved.

In a second aspect, the network device determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

In a third aspect, the network device flexibly adjusts the size of the second resource based on the receiving status of the data carried on the first resource, and configures a resource of an appropriate size for the terminal device. This can improve resource utilization while improving data transmission efficiency.

In a fourth aspect, the plurality of types of resource units are configured for the first resource, and the sizes and/or modulation and coding schemes of the resource units of any two types are different. Therefore, when the network device configures the size of the second resource, the network device can determine a quantity of resource units of a same type in the second resource based on the receiving status of the data carried on the resource units of each type in the first resource. In this way, the first terminal device can determine, based on a size of data that needs to be transmitted and/or a used modulation and coding scheme, an appropriate type of resource unit for sending the data. This can further improve data transmission efficiency.

In a fifth aspect, when little data is transmitted by using a grant-free resource or data transmission is infrequent, the network device can instruct, by using the second indication information based on a transmission status of current data, the first terminal device to use this embodiment of this application. To be specific, the second indication information is used to instruct the first terminal device to send the data by using the first resource, and the network device configures the second resource based on the receiving status of the data. This can effectively improve resource utilization.

An embodiment of this application further provides an information transmission method. Same as the foregoing information transmission method, using interaction between a network device and a terminal device #A (that is, an example of the first terminal device) as an example, the following describes an information transmission method 300 according to an embodiment of this application in detail.

Figure 4:
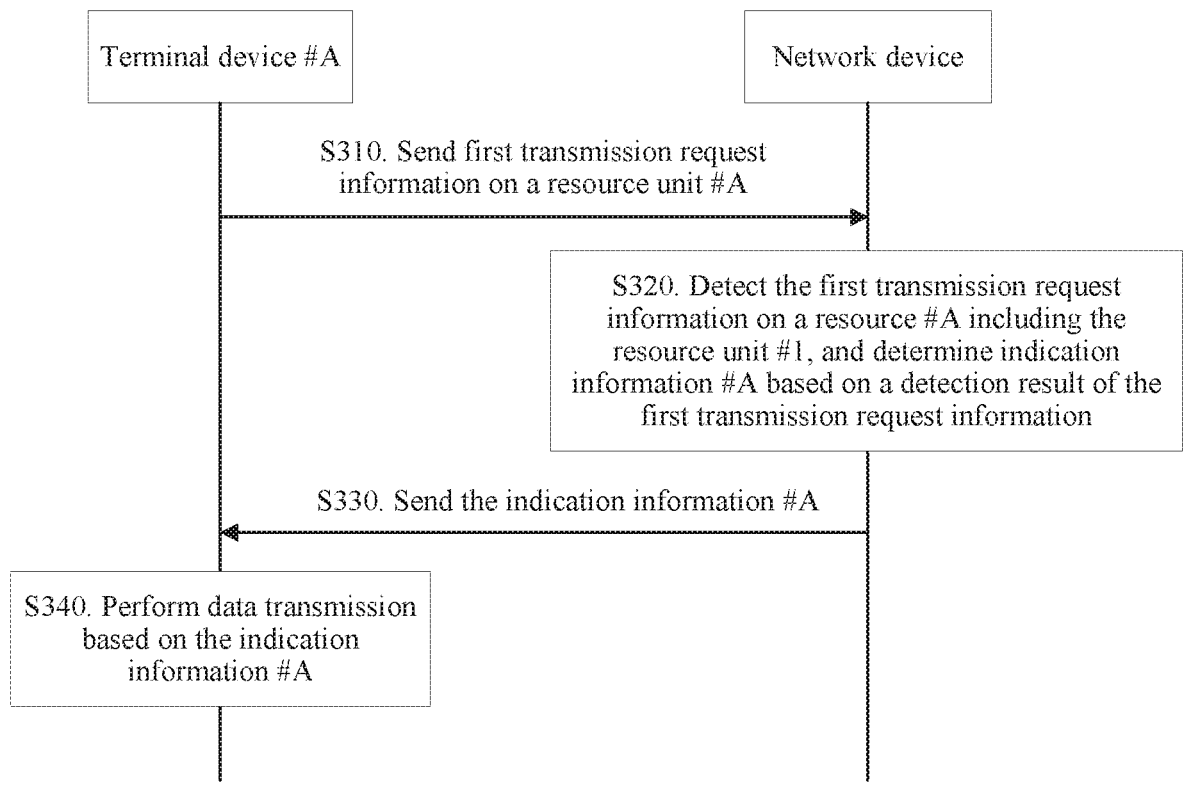
FIG. 4 is a schematic interaction diagram of an information transmission method according to an embodiment of this application.

As shown in FIG. 4, in S310, the terminal device #A sends first transmission request information on a resource unit #A, where the first transmission request information is used to indicate that the terminal device #A needs to send data, the resource unit #A belongs to the resource #A, and the resource #A is a preconfigured grant-free resource.

Specifically, a configuration mode of the resource #A (that is, an example of the first resource) is the same as that of the resource #1 in the method 200. To be specific, the resource #A is preconfigured in a system, the resource #A is a grant-free resource, and the resource #A is a periodic resource. For example, a size, a position, and a period of the resource #A are configured by using higher layer signaling or predefined in a standard. In a special example, the resource #A is a frequency band. To be specific, the frequency band is used as the resource #A dedicated for scheduling-free transmission.

In this embodiment of this application, the resource #A is configured by the network device and dedicated for sending the transmission request information by the terminal device, and the transmission request information indicates that the terminal device subsequently has data to be sent by using a grant-free resource. For example, for the terminal device #A, when the terminal device #A determines that the terminal device #A needs to send data by using a grant-free resource, the terminal device #A first selects a resource unit (that is, the resource unit #A) from the resource #A in a contention mode to send the first transmission request information, notifying the network device that the terminal device #A subsequently has data to be sent.

The transmission request information may be a simple signal, for example, a predefined signal sequence. The network device may detect, based on a value of power of the signal, whether the transmission request information exists, that is, whether the terminal device has data to be transmitted. Certainly, the network device may also determine, based on whether a predefined sequence is detected, whether the transmission request information exists, that is, whether the terminal device has data to be transmitted.

In S320, the network device detects the first transmission request on the resource #A, and determines the indication information #A (that is, an example of first indication information) based on a detection result of the first transmission request information, where the indication information #A is used to indicate whether a resource #B (that is, an example of a second resource) is configured, and the resource #B is used to transmit data. Therefore, in S330, the network device sends the indication information #A to the terminal device #A.

Specifically, the resource #A is used to send the transmission request information, and the resource #B is used to transmit the data. The network device determines, based on the detection result of the transmission request information on the resource #A, whether to configure the resource #B.

Using the terminal device #A as an example, after the terminal device #A sends the first transmission request information, if the network device detects the first transmission request information, the network device configures the resource #B, and indicates, by using the indication information #A, that the resource #B is configured. Based on some special cases, if the network device does not detect the first transmission request information, but detects, on the resource #A, transmission request information sent by another terminal device, the network device also configures the resource #B, and indicates, by using the indication information #A, that the resource #B is configured. If the network device neither detects the first transmission request information, nor detects transmission request information sent by another terminal device, the network device does not configure the resource #B, and indicates, by using the indication information #B, that the resource #B is not configured.

To be specific, when the network device detects the transmission request information on the resource #A, the network device configures the resource #B as long as any transmission request information is detected on the resource #A; or does not configure the resource #B if the network device does not detect transmission request information sent by any terminal device.

"The network device detects the transmission request information" in this embodiment of this application may be understood as "the network device correctly detects the transmission request information on the resource #A, or the network device detects, on the resource #A, a signal whose received power is greater than a preset threshold". Details are as follows:

When the network device correctly detects a transmission request signal on the resource #A, it indicates that a terminal device needs to transmit data, and in this case, the network device configures the resource #B.

In addition, when an excessively large quantity of terminal devices need to transmit transmission request information simultaneously, received power of the network device may be caused to exceed receiver maximum input power (Receiver maximum input level) of the network device. In this case, the network device cannot decode the transmission request information. However, in this case, the network device should also schedule the resource #B. Considering that the resource #A is dedicated for transmitting request information, when the network device detects, on the resource #A, a signal whose received power is greater than a preset threshold, it should be considered that a terminal device has sent transmission request information. Therefore, the resource #B should be configured.

It should be understood that, detecting the transmission request information in this embodiment of this application may also be understood as detecting a resource unit carrying the transmission request information.

According to the information transmission method in this embodiment of this application, the first resource used to send the transmission request information and the second resource used to send the data are set. Therefore, the network device can determine, based on an actual requirement of the terminal device and based on the detection result of the transmission request information sent on the first resource, whether to configure the second resource. Therefore, when the terminal device has a data requirement, the terminal device sends the data by using the second resource configured by the network device; and the network device does not configure the second resource in a time period in which there is no data transmission requirement. This effectively improves resource configuration flexibility.

Optionally, the indication information #A is specifically further used to indicate a size of the resource #B.

Specifically, in one case, the network device has preconfigured resources #B (denoted as a resource set #2 for ease of distinguishing and understanding) of different sizes and corresponding index numbers, or resources #B of different sizes in a resource set #B and corresponding index numbers are defined in a standard, where an index number is used to indicate a size of a resource #B. To be specific, mapping relationships between a plurality of resources #B of different sizes and index numbers exist. In this case, the indication information #A may indicate, by using the index number, whether the resource #B exists, and the size of the resource #B when the resource #B exists. Therefore, the terminal device #A can determine the size of the resource #B based on the index number included in the indication information #A.

For example, a value of preset bits in the indication information #A may be used to indicate the size of the resource #B; and if the value of the preset bits is 0, it indicates that the resource #B does not exist; if the value of the preset bits is 1, it indicates that the resource #B exists, that is, the index number corresponding to the resource #B is 1; or if the value of the preset bits is 2, it indicates that the resource #B exists, and the index number corresponding to the resource #B is 2.

In another case, the resource #B may be dynamically determined by the network device based on the detection status of the transmission request information on the resource #A. In this case, the resource set #B does not need to be configured by using a higher layer or defined in a standard. In this case, the indication information #A may directly indicate whether the resource #B exists, and the size of the resource #B when the resource #B exists.

For determining the size of the resource #B, optionally, the size of the resource #B is determined by the network device based on the detection result of the transmission request information carried on the resource #A.

Specifically, the size of the resource #B may be determined based on all transmission request information carried on the resource #A. The following uses a specific embodiment to describe how to determine the size of the resource #B.

In an embodiment, when the resource #A is a time-frequency resource, the resource #A may include a plurality of resource units in time domain, frequency domain, or time domain and frequency domain. Assuming that the resource #A includes N resource units, the network device detects each resource unit in the resource #A, and marks a resource unit on which transmission request information is correctly detected or a detected resource unit on which received power is greater than a third threshold, as a valid-request resource unit. It is assumed that a quantity of valid-request resource units in the N resource units is V, where V<N. Therefore, the network device can determine, based on the quantity V of valid-request resource units, or based on a proportion V/N of valid-request resource units to a total of resource units, the size of the resource #B that needs to be configured.

For example, it is assumed that $0<\beta_1<\beta_2<\beta_3<\ldots \leq 1$, where a size index of the resource #B is Si, i=1, 2, 3, ..., and $S1<S2<S3<\ldots$. In this case, when $V/N \leq \beta_1$, the size index of the resource #B configured by the network device is S1; when $\beta_1<V/N \leq \beta_2$, the size index of the resource #B configured by the network device is S2; when $\beta_2<V/N \leq \beta_3$, the size index of the resource #B configured by the network device is S3, and so on.

As an example rather than a limitation, the size index of the resource #B is Si, which may also be replaced with specific time-frequency resource allocation.

In another embodiment, when the resource #A is a combination of a time-frequency resource and a code domain resource, the resource #A may include a plurality of resource units in time domain, frequency domain, or time domain and frequency domain. The terminal device #A may select any one of the resource units, select an orthogonal sequence as transmission request information, and send the first transmission request information in a code division mode.

That the terminal device #A sends the first transmission request information in a code division mode may be CDMA spread spectrum transmission, or may be non-orthogonal transmission such as SCMA. In this case, a resource unit may be extended to the time domain, frequency domain, or time domain and frequency domain, and an orthogonal sequence is defined as a resource unit. The network device may determine, based on a quantity of resource units detected in the resource #A, that is, a quantity of orthogonal sequences successfully identified by the network device, the size of the resource #B that needs to be configured.

For example, assuming that the network device detects N orthogonal sequences in the resource #A, where each orthogonal sequence corresponds to transmission request information sent by one terminal device by using a grant-free resource, the network device may determine, based on a value of N, the size of the resource #B that needs to be configured. If N is larger, the resource #B that needs to be configured by the network device is larger.

The network device may configure different orthogonal sequences for different terminal devices as transmission request information, or the network device configures an orthogonal sequence pool, and at each time of sending, the terminal device randomly selects one orthogonal sequence from the orthogonal sequence pool as transmission request information, or all terminal devices may use a same sequence as transmission request information.

It should be noted that, when an orthogonal sequence is used as transmission request information, the transmission request information may also be referred to as a transmission request signal.

Therefore, the network device flexibly adjusts the size of the second resource based on the detection status of the transmission request information carried on the first resource, and configures the second resource of the appropriate size for the terminal device. This can improve resource utilization while improving data transmission efficiency.

In another embodiment, optionally, the resource #A includes a plurality of types of resource units, and data types of data indicated by transmission request information carried on resource units of any two types in the resource #A are different.

The resource #B includes at least one type of resource unit, sizes of resource units of any two types in the at least one type of resource unit in the resource #B are different, the at least one type of resource unit in the resource #B corresponds to at least one type of resource unit in the resource #A on a one-to-one basis, the at least one type of resource unit in the resource #A belongs to the plurality of types of resource units in the resource #A, each type of resource unit in the resource #B corresponds to a data type of data indicated by transmission request information carried on a corresponding resource unit in the resource #A, the data type is used to indicate a size of a corresponding resource unit in the resource #B, and/or the data type is used to indicate a modulation and coding scheme of data carried on a corresponding resource unit in the resource #B.

A quantity of resource units of each type in the resource #B is determined by the network device based on a detection result of transmission request information carried on a corresponding resource unit in the resource #A.

For example, the following describes the solution of this application by using an example in which a data type is used to indicate a size of a corresponding resource unit in the resource #B.

Specifically, the transmission request information not only indicates that the terminal device needs to send the data, but also indicates a data type of the to-be-sent data. Therefore, the plurality of types of resource units in the resource #A are related to the data type of the to-be-sent data. Each type of resource unit corresponds to at least one data type, and the data type is used to indicate a size of the to-be-transmitted data. In this way, the terminal device #A can select, based on the data type corresponding to the to-be-sent data, an appropriate resource unit for sending the transmission request information.

As described above, the data type is related to a service type of the to-be-sent data. The service type may be a video service, a picture service, a file downloading service, a short message service, a voice service, a social media service, or the like. Therefore, it may also be understood that resource units of different sizes may correspond to different service types.

Because sizes of transmission request information sent by terminal devices are all the same, sizes of the resource units of the plurality of types included in the resource #A may be all the same, and only resource units of different types are used to distinguish data types corresponding to the to-be-sent data.

The resource #B includes at least one type of resource unit. Because the resource #B is used to transmit the to-be-sent data, sizes of resource units of any two types in the resource #B are different. At least one type of resource unit in the resource #B corresponds to a data type corresponding to the to-be-sent data, and the data type is used to indicate a size of a corresponding resource unit in the resource #B.

Further, the network device may determine, based on a detection status of transmission request information carried on a same type of resource unit in the resource #A, a size of a corresponding resource unit in the resource #B.

In the same way, the terminal device #A can select, from the resource #B based on the size of the to-be-transmitted data (or based on a service type of data that needs to be transmitted currently), an appropriate type of resource unit for sending the data.

It should be noted that, the resource #B may include at least one type of resource unit corresponding to the resource #A. For example, if the resource #A includes three types of resource units, the resource #B may include one type, two types, or three types of resource units.

Figure 5:
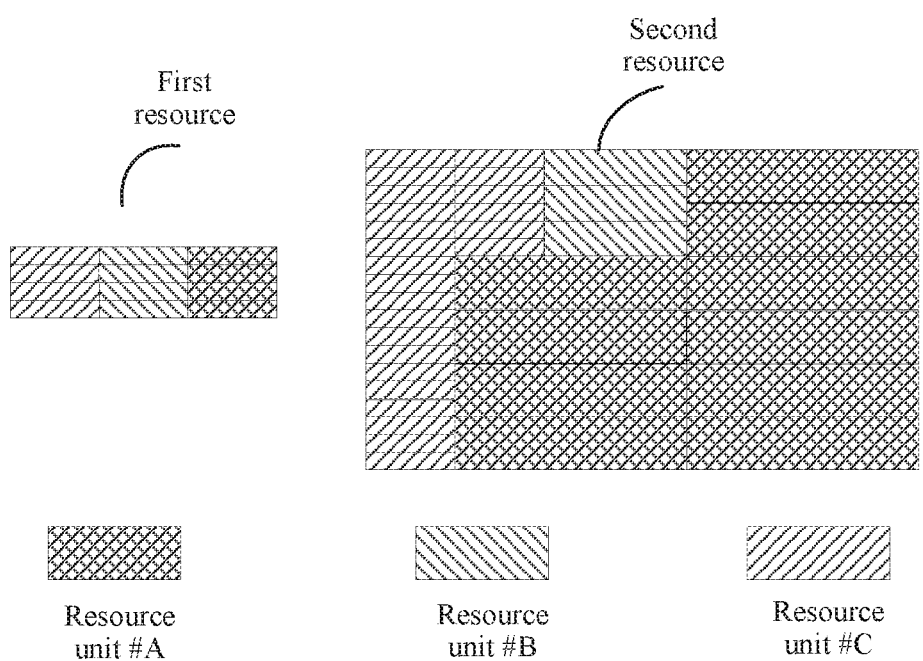
FIG. 5 is a schematic structural diagram of a first resource and a second resource according to another embodiment of this application.

For example, FIG. 5 is a schematic structural diagram of the first resource and the second resource according to another embodiment of this application. As shown in FIG. 5, the resource #A includes three types of resource units: a resource unit #A, a resource unit #B, and a resource unit #C respectively. Transmission request information carried in the resource unit #A corresponds to services that occupy relatively large resources, such as the video service, the picture service, and the file downloading service, transmission request information carried in the resource unit #B corresponds to services that occupy moderate resources such as the social media service, and transmission request information carried in the resource unit #C corresponds to services that occupy relatively small resources such as the short message service and the voice service. The three types of resources all carry transmission request information sent by different terminal devices. The network device detects the transmission request information on all the three types of resources in the resource #A, and configures the resource #B based on a detection status of transmission request information carried on each type of resource unit. In this case, three types of resource units may be configured for the resource #B. Based on a detection status of transmission request information carried on the resource unit #A in the resource #A, 10 resource units #A are configured for the resource #B; based on a detection status of transmission request information carried on the resource unit #B in the resource #A, 3 resource units #B are configured for the resource #B; and based on a detection status of transmission request information carried on the resource unit #C in the resource #A, 3 resource units #B and 24 resource units #C are configured for the resource #B.

For another example, likewise, the resource #A includes three types of resource units: a resource unit #A, a resource unit #B, and a resource unit #C respectively. The three types of resources all carry transmission request information sent by different terminal devices. The resource #B is configured based on a detection status of transmission request information carried on each type of resource unit. In this case, two types of resource units may be configured for the resource #B, and quantities of resource units of different types are determined based on a detection status of transmission request information carried on corresponding resource units in the resource #A.

The plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the terminal device can determine, based on the size of the data that needs to be transmitted, an appropriate type of resource unit for sending the data on the second resource. This can further improve data transmission efficiency.

It should be noted that, modulation and coding schemes of the resource units of the two different types may also be different (that is, resource units of different types are bound with different modulation and coding schemes), or both the sizes and modulation and coding schemes are different. Details are not described again. A modulation and coding scheme used by the terminal device for transmission is generally determined based on a channel status. For example, a channel of a terminal device that is relatively close to the network device is generally relatively good, and may use a relatively high order modulation and coding scheme for transmission; and a channel of a terminal device that is relatively far from the network device is generally relatively good, and may use a relatively low order modulation and coding scheme for transmission. The network device does not know in advance how many terminal devices are far from the network device and have data to be transmitted and how many terminal devices are close to the network device and have data to be transmitted. Therefore, based on a detection status on each type of resource unit in the resource #A, the network device can determine how many corresponding resource units are configured in the resource #B.

Optionally, the indication information #A is further used to indicate the position of the resource #B.

To be specific, the resource #B may be a time domain resource, and the indication information #A is used to indicate a position of the time domain resource, or indicate allocation of the time domain resource; or the resource #B may be a frequency domain resource, and the indication information #A is used to indicate a position of the frequency domain resource, or indicate allocation of the frequency domain resource; or the resource #B may be a time-frequency resource, and the indication information #A is used to indicate a position of the time-frequency resource, or indicate allocation of the time-frequency resource.

When the indication information #A is used to indicate the position of the resource #B, it may also be considered that the indication information #A indicates the size of the resource #B, because resource allocation of the resource #B actually implicitly includes the size of the resource #B.

For example, if the resource #B is a time domain resource, the indication information #A indicates a start point and a time domain length of the time domain resource, and a unique position of the time domain resource is determined by using the start point and the time domain length of the time domain resource. This is actually equivalent to indicating a size of the time domain resource.

For another example, if the resource #B is a frequency domain resource, the indication information #A indicates a start point and a frequency domain width of the frequency domain resource, and a unique position of the frequency domain resource is determined by using the start point and the frequency domain length of the frequency domain resource. This is actually equivalent to indicating a size of the frequency domain resource.

Optionally, a resource #C used for carrying the indication information #A is any one of a physical downlink control channel (Physical Downlink Control Channel, PDCCH), a physical hybrid automatic repeat indicator channel (Physical Hybrid ARQ Indicator Channel, PHICH), or a PHICH-like.

For descriptions about the resource #C, refer to the descriptions about the resource #3 in the method 200. Details are not described again herein for brevity.

Optionally, before the network device sends the indication information #A, the method further includes:

the network device sends indication information #C, where the indication information #C is used to instruct the terminal device #A to send the transmission request information by using the resource #A, and the network device configures the resource #B based on the detection result of the transmission request information.

Specifically, the network device may determine and instruct, based on a data amount of data currently sent or frequency at which data is sent by using a scheduling-free resource, to use this embodiment of this application. To be specific, a mechanism in this embodiment of this application is enabled when little data is transmitted by using a grant-free resource or enabled in a time period in which data transmission by using a grant-free resource is infrequent. In other words, the indication information #C (that is, an example of third indication information) is used to instruct the terminal device to use the resource #A to send the transmission request information, and the network device configures the resource #B based on the detection result of the transmission request information.

More specifically, when little data is transmitted by using the grant-free resource or data transmission is infrequent, the network device indicates, by using the indication information #C, that the terminal device #A may send the transmission request information on the resource #A before sending the data. In addition, the network device configures the resource #B based on the detection status of the transmission request information on the resource #A.

When more data is transmitted by using the grant-free resource or data transmission is more frequent, the network device also instructs, by using signaling, the terminal device #A not to use this embodiment of this application for data transmission, that is, instructs the terminal device #A to send the data (initial transmission data and/or retransmission data) on a periodic grant-free resource configured by the network device. In addition, the network device does not send the indication information #A for configuring the resource #B.

In this embodiment of this application, the indication information #C may be carried by higher layer signaling such as RRC or a MAC CE, system information (for example, a SIB), or other physical layer signaling (for example, the PDCCH).

Therefore, when little data is transmitted by using a grant-free resource or data transmission is infrequent, the network device can instruct, by using the third indication information based on a transmission status of current data, the terminal device to use this embodiment of this application. To be specific, the third indication information is used to instruct the terminal device to send the transmission request information by using the first resource, and the network device configures the second resource based on the detection result of the transmission request information. This can effectively improve resource utilization.

According to the information transmission method in this embodiment of this application, in one aspect, the first resource used to send the transmission request information and the second resource used to send the data are set. Therefore, the network device can determine, based on an actual requirement of the terminal device and based on the detection result of the transmission request information sent on the first resource, whether to configure the second resource. Therefore, when the terminal device has a data requirement, the terminal device sends the data by using the second resource configured by the network device; and the network device does not configure the second resource in a time period in which there is no data transmission requirement. This effectively improves resource configuration flexibility.

In another aspect, the network device flexibly adjusts the size of the second resource based on the detection status of the transmission request information carried on the first resource, and configures the second resource of the appropriate size for the terminal device. This can improve resource utilization while improving data transmission efficiency.

In another aspect, the plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the terminal device can determine, based on the size of the data that needs to be transmitted, an appropriate type of resource unit for sending the data on the second resource. This can further improve data transmission efficiency.

In another aspect, when little data is transmitted by using a grant-free resource or data transmission is infrequent, the network device can instruct, by using the third indication information based on a transmission status of current data, the terminal device to use this embodiment of this application. To be specific, the third indication information is used to instruct the terminal device to send the transmission request information by using the first resource, and the network device configures the second resource based on the detection result of the transmission request information. This can effectively improve resource utilization.

The following describes an embodiment of this application in detail in another description manner. A contention transmission unit (Contention Transmission Unit, CTU) in the following descriptions is the resource unit in the foregoing descriptions, and grant-free data is the data sent by using the grant-free resource or the data sent in the grant-free transmission mode in the foregoing descriptions. In Opt 1, first information is the first data in the foregoing descriptions, and second information is the retransmission data in the foregoing descriptions. In Opt 2, first information is the first transmission request information in the foregoing descriptions, and second information is the data corresponding to the transmission request information in the foregoing descriptions. A first resource in the following descriptions is the first resource in the foregoing descriptions, a second resource in the following descriptions is the second resource in the foregoing descriptions, second resource indication information in the following descriptions is the first indication information in the foregoing descriptions, and a third resource in the following descriptions is the third resource in the foregoing descriptions.

First, a grant-free related concept is defined. A CTU is a basic resource unit when UE performs grant-free transmission. The CTU may be defined as a time-frequency resource block. In this case, a unique time-frequency resource corresponding to a CTU is determined by using a time domain start point, a time domain length, a frequency domain start point, and a frequency domain width. The CTU may be further extended and defined as a resource in another dimension. For example, if a non-orthogonal multiple access technology (such as SCMA) is used for grant-free transmission, the definition of the CTU may be further extended to a code domain. To be specific, the CTU is defined as a combination of a time-frequency resource and a code domain resource. Specifically, for SCMA, the CTU is defined as a combination of time-frequency resource, an SCMA codebook, and a pilot sequence. For ease of describing the solution, in this application, an example in which the CTU is defined as a time-frequency resource block is used for description. However, it is easily understood that, all embodiments of this application may be used in a case in which the CTU uses other definitions. Each grant-free transmission resource pool may include one or more CUTs, sizes of different CTUs may be different, and CTUs of different sizes are applicable to data transmission of different services. In some embodiments of this application, the CTU is also referred to as a sub resource.

In this application, the grant-free transmission resource pool includes two parts: a first resource and a second resource, where the first resource is configured by a base station in a semi-static mode, and the second resource is dynamically configured by the base station based on a receiving status on the first resource.

When the UE has data to be transmitted in the grant-free mode, the first information is first sent on the first resource, and the first information may be:

Opt 1: an initial transmission version of grant-free data of the UE; or

Opt 2: a grant-free transmission request signal, indicating that the UE has grant-free data to be transmitted. The signal may be a very simple signal, for example, a predefined signal sequence.

When detecting the first information on the first resource, the base station configures the second resource, where the second resource is used by the UE to transmit the second information, and the second information may be:

Opt 1: a repetition (repetition) or retransmission (retransmission) version of the grant-free data of the UE; or Opt 2: the grant-free data of the UE, where regardless of the initial transmission version or the repetition or retransmission version, transmission is performed on the second resource.

In the Opt 1, the second information may be the repetition or retransmission version of the grant-free data of the UE. This is relative to the first information (that is, the initial transmission version of the data), and specifically includes three possible cases:

Case 1: All second information sent by the UE on the second resource is repetition versions of the first information. To be specific, the second information and the first information are completely the same. For example, both are RV0 of the transmission data. Currently, it is agreed in a standard that during grant-free transmission of data corresponding to a same TB, the data may be repeatedly transmitted for a maximum of K times, where a value of K is configured by the base station.

Case 2: All second information sent by the UE on the second resource is retransmission versions of the first information. To be specific, the first information and the second information are different redundancy versions of the transmission data. For example, the first information is RV0 of the transmission data, and the second information is RV1, RV2, or the like of the transmission data.

Case 2: The second information sent by the UE on the second resource includes both the repetition version and the retransmission version of the first information. For example, the first information sent by the UE is RV0 of the transmission data, transmission is performed on the second resource for three times, and what is transmitted is RV0, RV2, and RV2 of the transmission data respectively. Obviously, both the repetition version and the retransmission version are included. However, what is transmitted by the UE on the second resource each time is a repetition version of a previous transmission version, or is a retransmission version of a previous transmission version, but cannot be both the repetition version and the retransmission version of the previous transmission version.

It should be especially noted that same Opts in this application correspond to each other on a one-to-one basis. To be specific, all Opts 1 belong to a same embodiment, and all Opts 2 belong to another embodiment.

In the foregoing descriptions, that the base station configures the second resource when the base station detects the first information on the first resource actually means that the base station detects, on the first resource, transmission performed by a user but does not correctly decode data (corresponding to the Opt 1), or detects a grant-free transmission request signal sent by a user (corresponding to an Opt 2). Specifically, for different Opts, "the base station detects the first information on the first resource" has different meanings:

Opt 1: The first resource may include one or more CTUs. When the base station detects a signal (for example, detects a signal whose received power is greater than a first threshold, or detects sending of a UE ID of the UE) on any CTU of the first resource but does not correctly decode the data, the second resource is configured. In other words, if the base station correctly decodes data on all CTUs on the first resource, or detected signal power is lower than the first threshold, the second resource is not configured, because the first resource is sufficient for use in current grant-free transmission. That the base station detects sending of the UE ID of the UE but does not correctly decode the data occurs in a case in which the UE ID is indicated in an explicit or implicit manner in the grant-free data. For example, the UE ID is indicated by using a DMRS, or the grant-free data includes a control part and a data part that are independent, and the control part includes the UE ID. In this case, the base station may successfully detect the UE ID but does not correctly decode the data.

Opt 2: When the base station correctly detects a transmission request signal, it indicates that the UE needs to transmit data, and the base station configures the second resource. In addition, when an excessively large quantity of UEs send transmission request signals simultaneously, received power of a base station side may be caused to exceed receiver maximum input power (Receiver maximum input level) of the base station. In this case, the base station cannot decode the request signal. However, in this case, the base station should also schedule the second resource. Considering that the first resource is dedicated for sending a grant-free transmission request signal by the UE, and is not occupied by another signal, when the base station detects a signal whose received power is greater than a second threshold on the first resource, it should be considered that the UE has sent a transmission request signal. Therefore, the second resource should be configured. Therefore, "the base station detects the first information on the first resource" means that the base station correctly detects the transmission request signal on the first resource or that the base station detects, on the first resource, the signal whose received power is greater than the second threshold. Considering that the first resource may include a plurality of sub resources, the detection may be performed on each sub resource. To be specific, when the base station correctly detects, on any sub resource, a transmission request signal or a signal whose received power is greater than the second threshold, the base station configures the second resource. If the base station does not detect a transmission request signal on any sub resource, and does not detect any signal whose received power is greater than the second threshold, the base station does not configure the second resource.

A size of the first resource and a position thereof in time domain and frequency domain are configured by the base station in a semi-static mode. This means that the configuration of the first resource keeps unchanged, or changes only after a very long time, that is, the first resource is reconfigured only after a very long time. Specifically, the semi-static configuration of the first resource may be performed in the following manner:

The configuration is performed by using higher layer signaling. For example, the configuration is configured by using RRC signaling. Specifically, configuration information of the first resource may be carried by a dedicated SIB.

The configuration of the first resource is predefined in a standard. For example, the standard defines a narrow band as a UL grant-free first resource in an FDD mode, so that when the UE has data to be sent at any time, the data may be transmitted by the first resource. Therefore, a latency requirement in grant-free transmission of a URLLC service is satisfied.

The base station may adjust the size of the first resource and/or the position thereof in time domain and frequency domain. For example, in a time period in which there is a lot of grant-free data, the base station configures a relatively large first resource; and in a time period in which there is little grant-free data, the base station configures a relatively small first resource.

When the base station dynamically configures the second resource, signaling needs to be used for indicating. To be specific, the base station needs to send second resource indication information for configuring the second resource. A resource for transmitting the second resource indication information is referred to as a third resource. With reference to the semi-static configuration mode, the second resource indication information may include different content:

If the base station has configured the size of the second resource in advance by using higher layer signaling, or the size of the second resource is defined in a standard, the second resource indication information only needs to indicate whether the second resource exists. The position of the second resource in time domain and frequency domain may also be predefined in a standard, or configured by using higher layer signaling.

If the base station has configured second resources of different sizes and corresponding size indexes by using higher layer signaling, or second resources of different sizes and corresponding size indexes (Size Index) are defined in a standard, the second resource indication information may indicate whether the second resource exists, and a size index when the second resource exists. For example, if the second resource indication information is 0, it indicates that the second resource does not exist; if the second resource indication information is 1, it indicates that the second resource exists, and Size Index=1; or if the second resource indication information is 2, it indicates that the second resource exists, and Size Index=2. The position of the second resource in time domain and frequency domain may be predefined in a standard, or configured by using higher layer signaling.

The second resource indication information may directly indicate whether the second resource exists and the size of the second resource when the second resource exists. In this case, the size of the second resource does not need to be configured by using a higher layer or defined in a standard. The position of the second resource in time domain and frequency domain may be predefined in a standard, or configured by using higher layer signaling, or indicated in the second resource indication information.

The first resource should appear periodically. For example, the size, the position, and a period of the first resource are configured by using higher layer signaling or predefined in a standard. In a special example, the first resource is a frequency band. To be specific, the frequency band is used as the first resource dedicated for grant-free transmission. The indication information for configuring the first resource may be referred to as first resource indication information.

The third resource may be a resource corresponding to group common DCI. To be specific, the group common DCI located in the third resource is used to carry the second resource indication information.

The third resource may also be a PHICH or a PHICH-like (PHICH-like) physical channel, that is, the second resource indication information is carried by the PHICH or the PHICH-like. The PHICH-like may be an extension of the PHICH. This is because after the UE sends the first information on the first resource, the UE needs to receive response information on the PHICH or the PHICH-like. In this case, the UE may receive an ACK, or may receive the second resource indication information. If the UE receives the latter, it means that the base station cannot correctly decode the first information. Therefore, the second resource is configured for transmitting the repetition or retransmission version of the data. In other words, the response to the first information by the base station and the second resource indication information may be multiplexed to a same resource, that is, transmitted on the PHICH or the PHICH-like.

The third resource may be periodic or aperiodic. When the UE has data to be sent and detects, from the third resource, that the base station exactly schedules the second resource, the UE may directly transmit the data on the second resource, without first transmitting the first information on the first resource. This case occurs when UE 1 sends first information on the first resource, and triggers the base station to send second resource indication information on the third resource, but the second resource indication information is exactly detected by UE 2. For the Opt 1, the second resource in this case may also be used to transmit the initial transmission version of the data.

The solution in this application may be shown in FIG. 6. A first diagram in FIG. 6 is a case in which the first resource is a periodic time-frequency resource block, and a second diagram in FIG. 6 is a case in which the first resource is a fixed frequency band resource. FIG. 6 gives only an example in which the second resource indication information on the third resource is used to indicate whether the second resource exists. Another example in which the second resource indication information is used to indicate other information (such as the size of the second resource) of the second resource is similar to this, and details are not described again. In FIG. 6, a dashed-line block indicates that the resource is actually not configured. This also applies to other subsequent figures.

For the Opt 2, because the UE always first sends a grant-free transmission request signal before sending UL data, a transmission latency of the UL data may be affected. Therefore, the solution of the Opt 2 of this application may not be applicable to a latency-sensitive service (such as an ultra-reliable and low latency communications (Ultra-reliable and Low Latency Communications, URLLC) service), but is applicable to a service (such as massive machine type communications (Massive Machine Type Communications, mMTC) service) that does not have a high transmission latency requirement. Addition of a fourth resource may be considered, so that the Opt 2 is also applicable to the latency-sensitive service. The fourth resource is a fixed frequency band, or is a time-frequency resource block that appears frequently and periodically, and is used to transmit the latency-sensitive service, to ensure a relatively low transmission latency. FIG. 7 is an example of the fourth resource that is a fixed frequency band. When the UE transmits the latency-sensitive service, the service is directly transmitted on the fourth resource. When the UE transmits a service that does not have a high transmission latency requirement, the UE selects to first send a grant-free transmission request signal on the first resource, and then transmits UL data on the second resource scheduled by the base station. Certainly, if the UE that transmits the latency-sensitive service fails to perform transmission on the fourth resource, a repetition or retransmission version of the data may also be transmitted on the second resource. In other words, the fourth resource is used to ensure the transmission latency requirement of the latency-sensitive service as much as possible, but once the transmission fails, the repetition version or retransmission version of the data may also be transmitted by using the second resource, but a latency-insensitive service is transmitted only on the second resource.

In the Opt 1 of this application, the first resource is a basic transmission resource for grant-free transmission, and the configuration of the first resource is relatively stable. The base station schedules the second resource by using the third resource only when the base station considers that the first resource cannot satisfy a current grant-free transmission requirement, where the second resource is a supplementary to the first resource. In other words, if the first resource satisfies the current grant-free transmission requirement, the base station does not schedule the second resource. This saves transmission resources, and improves resource utilization. Further, the base station may indicate the size of the scheduled second resource by using the third resource, that is, flexibly adjust the second resource based on a requirement. This further improves resource utilization in grant-free transmission.

In the Opt 2 of this application, the first resource is a very small resource. The second resource configured by using the third resource is used for grant-free data transmission only when the base station detects a grant-free transmission request signal on the first resource or detects a signal whose received power is greater than the second threshold. However, when no UE needs to perform grant-free transmission, the base station does not schedule the second resource. Therefore, an objective of improving resource utilization is achieved. Likewise, the base station may indicate the size of the scheduled second resource by using the third resource, that is, flexibly adjust the second resource based on a requirement. This further improves resource utilization in grant-free transmission.

Embodiment 1 of this Application

A data amount of data transmitted by UE within coverage of a base station by using a grant-free mechanism may be time-varying. For example, in some time periods, grant-free data is frequent, but in other time periods, there is little grant-free data.

For a time period in which grant-free data is frequent, the foregoing solution in this application is insignificant, and cannot improve resource utilization, but may even reduce resource utilization. For example, for the Opt 1, in a time period in which grant-free data is frequent, a large quantity of UEs send initial transmission data on a first resource, but the initial transmission data collides with each other, and basically cannot be sent successfully, and actual data transmission basically depends on a repetition or retransmission version on a second resource. In this case, the first resource and a third resource are obviously wasted. For the Opt 2, in a time period in which grant-free data is frequent, a large quantity of UEs send grant-free transmission request signals on a first resource, and this causes the base station to detect a grant-free transmission request signal on almost every first resource and further always schedule a second resource by using a third resource. However, an event that always occurs does not need to be indicated. In other words, in this case, both the first resource and the third resource are wasted. The foregoing solution in this application can have a good effect in improving resource utilization only when the grant-free data is not excessively frequent and a time of data arrival is not determined.

Based on the foregoing analysis, the base station may determine and indicate, based on a data amount of current grant-free data or data frequency, whether to enable the foregoing resource utilization improvement solution. To be specific, the mechanism of this application is enabled in a time period in which there is little grant-free data or grant-free data is infrequent, and the mechanism of this application is disabled when there is a lot of grant-free data or grant-free data is frequent. Specifically, the embodiment includes the following:

When there is little grant-free data or grant-free data is infrequent, the base station indicates that the foregoing resource utilization improvement solution is enabled, to be specific, indicates that before the UE sends grant-free data, the UE must send first information on the first resource, and then the base station can actually configure the second resource. The case is the same regardless of the Opt 1 or the Opt 2, except that first information content in the two Opt cases is different.

When there is a lot of grant-free data or grant-free data is frequent, the base station indicates that the foregoing resource utilization improvement solution is disabled, to be specific, instructs the UE to send an initial transmission version and a repetition or retransmission version of the grant-free data in a periodic grant-free transmission resource pool configured by the base station. For different Opts, definitions of the periodic grant-free transmission resource pool may be different.

Opt 1: The periodic grant-free transmission resource pool may be the first resource, the second resource, or (the first resource and the second resource), or another periodic resource configured by the base station. In this case, none of other resources than the periodic grant-free transmission resource pool needs to exist, for example, without requiring the third resource, thereby reducing resource overheads.

Opt 2: The periodic grant-free transmission resource pool may also be a second resource, or another periodic resource configured by the base station. In this case, no other resource than the periodic grant-free transmission resource pool is required. For example, the first resource and the third resource are not required. Therefore, resource overheads are reduced.

A data amount or data frequency of grant-free data in each time period may be observed by using the base station. For example, the base station measures an amount of grant-free data in each time period in 24 hours every day, to further determine a time period in which a data amount is relatively large.

Figure 8:
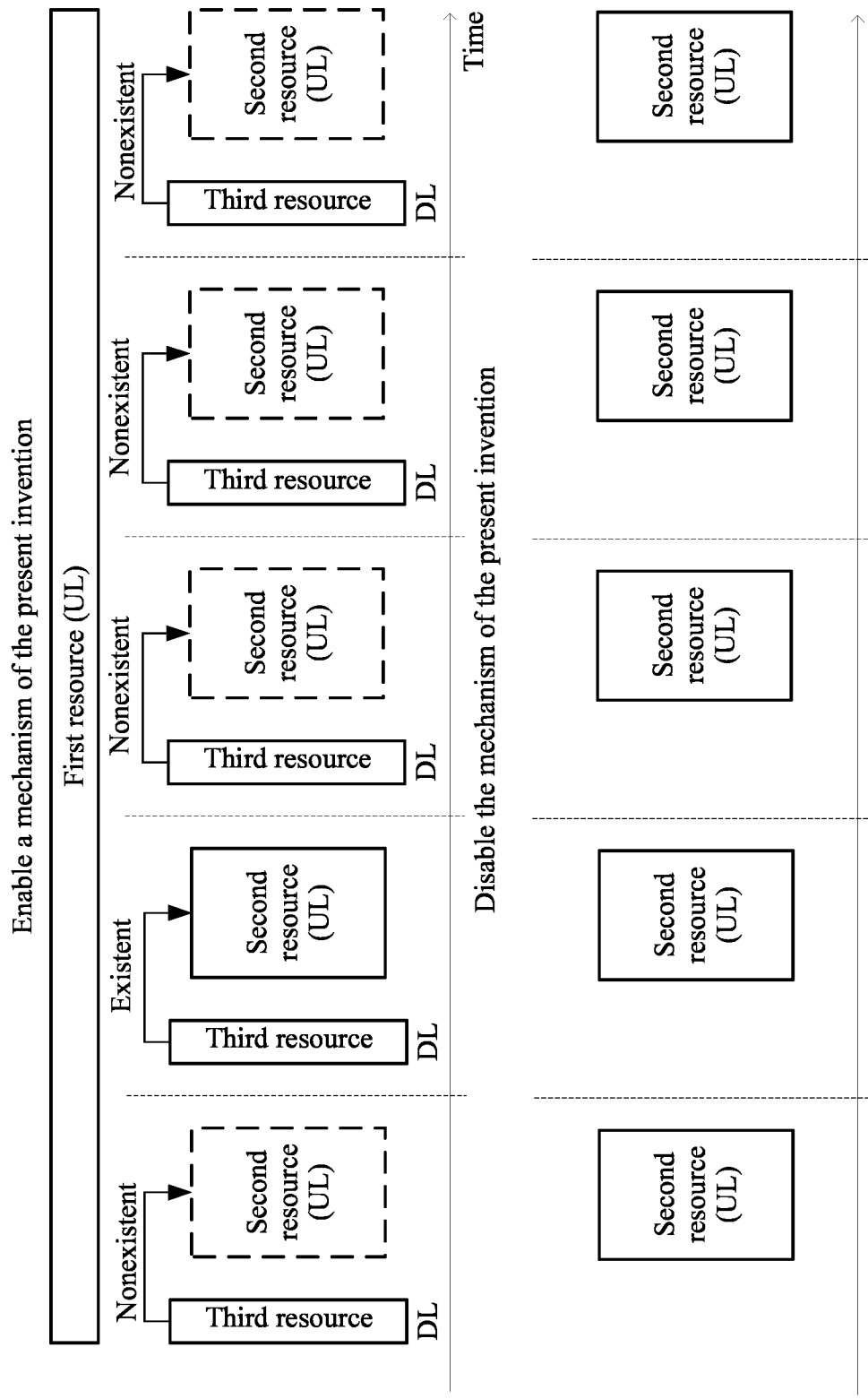
FIG. 8 is a schematic structural diagram of a first resource, a second resource, and a third resource according to another embodiment of this application.

FIG. 8 is an example of a periodic grant-free resource pool that is a second resource.

The base station may transmit an enable/disable indication by using higher layer signaling such as RRC, to indicate that the foregoing mechanism for improving resource utilization in this application is enabled/disabled. For example, the enable/disable indication is carried by a SIB. The base station may further use other physical layer signaling to carry the enable/disable indication. For example, the enable/disable indication is carried by group common DCI.

The enable/disable indication may be referred to as a switch indication. When the switch indication indicates ON (ON), which actually indicates that the UE has grant-free data to be transmitted, the UE needs to first send the first information on the first resource. It should be noted that, the switch indication and the configuration of the first resource by the base station are different concepts. The configuration of the first resource by the base station means that the base station specifies information such as a size, a position, and a period of the first resource, but whether a current system actually enables the first resource is determined by the switch indication. When the switch indication is ON (ON), the first resource configured by the base station takes effect, and the UE sends the first information on the first resource configured by the base station. When the switch indication is OFF (OFF), the first resource actually does not exist in the system, that is, the first resource configured by the base station is used for other purposes, but configuration information of the first resource still exists and is only not enabled currently.

Embodiment 2 of the Present Invention

A size of a second resource is determined based on a detection status on a first resource.

As described above, a base station may indicate a size of a configured second resource by using second resource indication information on a third resource, but how the base station determines a size of a second resource that should be configured currently is a problem that needs to be resolved.

A solution is: the base station determines, based on a detection status of first information sent by UE on the first resource, the size of the second resource that needs to be configured. The process of determining by the base station, based on the detection status on the first resource, the size of the second resource that needs to be configured, may be implemented in the base station, or may be specifically specified in a standard.

The first resource may be a resource in time domain and frequency domain, and includes a plurality of sub resources (that is, CTUs) in time domain, or frequency domain, or time domain and frequency domain. As shown in FIG. 9, the UE selects one of the sub resources to send the first information. In this case, the base station may determine, based on detection statuses on the plurality of sub resources included in the first resource, the size of the second resource that needs to be configured. Assuming that the first resource includes N sub resources, for different Opts, methods for determining the size of the second resource by the base station based on the detection status on the first resource may vary. The following is a specific example.

Opt 1: The base station detects each sub resource in the first resource, and marks a detected sub resource on which received power is greater than a first threshold (or a UE ID is correctly detected) but no data is correctly decoded, as a colliding sub resource. It is assumed that a quantity of colliding sub resources in the N sub resources is M, where 0<M≤N. Therefore, the base station can determine, based on the quantity M of colliding sub resources or based on a proportion M/N of colliding sub resources to a total of sub resources, the size of the second resource that needs to be configured. For example, it is assumed that $0<\alpha 1<\alpha 2<\alpha 3<\ldots \leq 1$, where a size index of the second resource is Si, i=1, 2, 3, . . . , and S1<S2<S3< . . . . In this case, when M/N≤α1, the size index of the second resource configured by the base station is S1; when α1<M/N≤α2, the size index of the second resource configured by the base station is S3 . . . .

Opt 2: The base station detects each sub resource in the first resource, and marks a sub resource on which a transmission request signal is correctly detected or a detected sub resource on which received power is greater than a second threshold, as a valid-request sub resource. It is assumed that a quantity of valid-request sub resources in the N sub resources is V, where V≤N. Therefore, the base station can determine, based on the quantity V of valid-request sub resources or based on a proportion V/N of valid-request sub resources to a total of sub resources, the size of the second resource that needs to be configured. For example, it is assumed that $0<\beta 1<\beta 2<\beta 3<\ldots \leq 1$, where a size index of the second resource is Si, i=1, 2, 3, . . . , and S1<S2< S3< . . . . In this case, when V/N≤β1, the size index of the second resource configured by the base station is S1; when β1<V/N≤β2, the size index of the second resource configured by the base station is S2; when β2<V/N≤β3, the size index of the second resource configured by the base station is S3 . . . .

Further, the first resource may be a combination of a resource in time domain and frequency domain and a resource in code domain. The first resource includes one or more resource blocks in time domain, or frequency domain, or time domain and frequency domain. The UE may select one of the resource blocks, select one orthogonal sequence as the first information, and send the first information in a code division mode. Sending the first message in the code division mode may be CDMA spread spectrum transmission, or may be non-orthogonal transmission such as SCMA. In this case, a tuple (resource block, orthogonal sequence) may be defined as a sub resource. The base station may determine, based on a quantity of sub resources detected in the first resource, that is, a quantity of orthogonal sequences successfully identified by the base station, the size of the second resource that needs to be configured. For different Opts, methods for determining the size of the second resource by the base station based on the detection status on the first resource may vary. The following is a specific example.

(1) Opt 1: The base station allocates different DMRS sequences to different UEs to achieve an objective of distinguishing the UEs. It is assumed that the base station detects N DMRS sequences, but correctly decodes M pieces of data, where M<N. Therefore, the base station can determine, based on M or based on (N−M)/N, the size of the second resource that needs to be configured. For example, it is assumed that $0<\alpha_1<\alpha_2<\alpha_3<\ldots$, where a size index of the second resource is Si, i=1, 2, 3, . . . , and $S_1<S_2<S3<\ldots<1$. In this case, when (N−M)/N≤$\alpha_1$, the size index of the second resource configured by the base station is $S_1$; when $\alpha_1$<(N−M)/N≤$\alpha_2$, the size index of the second resource configured by the base station is $S_2$; when $\alpha_2$<(N−M)/N≤$\alpha_3$, the size index of the second resource configured by the base station is $S_3$ . . . .

(2) Opt 2: Assuming that the base station detects N orthogonal sequences in total in the first resource, where each orthogonal sequence corresponds to a grant-free transmission request signal sent by one UE, the base station may determine, based on N, the size of the second resource that needs to be configured. If N is larger, the second resource that needs to be configured by the base station is larger. The base station may configure different orthogonal sequences for different UEs as grant-free transmission request signals, or the base station configures an orthogonal sequence pool, and at each time of sending, the UE randomly selects one orthogonal sequence from the orthogonal sequence pool as a grant-free transmission request signal, or all UEs use a same sequence as a grant-free transmission request signal.

Data lengths of different services may be different. Correspondingly, the grant-free transmission resource pool possibly should include CTUs of different sizes to adapt to different service transmission requirements. Assuming that three types of CTUs are defined, and that sizes of CTUs of different types are different, transmission on the first resource should enable the base station to estimate quantities of UEs requiring CTUs of different sizes and configure appropriate quantities of CTUs of the three types in the second resource. With respect to a given type of CTU, for how the base station determines a quantity of CTUs of the type in the second resource based on receiving on the first resource, refer to the foregoing method for determining the size of the second resource based on receiving on the first resource. Alternatively, another method may be used. It should be noted that, in this case, the foregoing "size of the second resource" and "quantity of CTUs of the type" herein have a same meaning. To be specific, for a specific type of CTU, a quantity of CUTs is equivalent to a size of an occupied resource. Certainly, when the second resource includes a plurality of CTUs of different sizes, a sum of resources occupied by the plurality of CTUs is "the size of the second resource".

For the Opt 1, the first resource should include three types of CTUs, and the base station determines, based on a receiving status on each type of CTU, how many CTUs of each type should be configured in the second resource, as shown in FIG. 10. Blocks of different background colors or grids represent different types of CTUs. During sending, the UE selects, based on a current service requirement, a CTU from CTUs of a corresponding type in the first resource for transmission.

Figure 11:
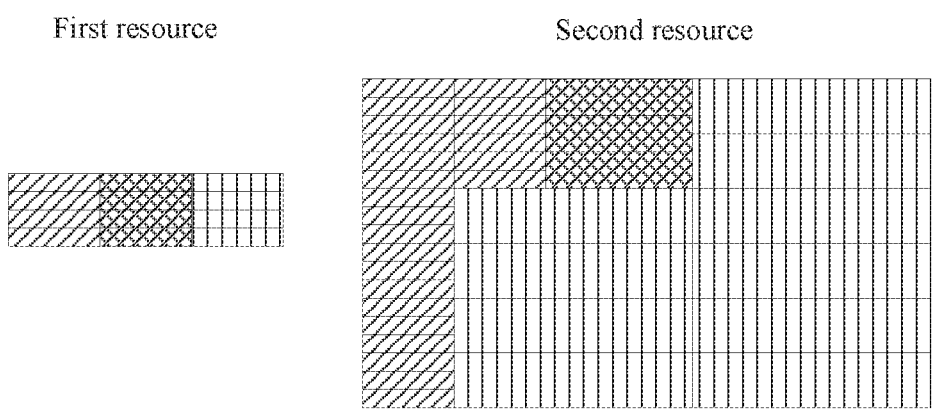

For the Opt 2, sizes of a plurality of CTUs included in the first resource do not need to be distinguished. To be specific, sizes of all CTUs in the first resource are the same, because sizes of grant-free transmission request signals sent by different UEs are the same. However, which sub resources in the first resource correspond to three types of CTUs respectively need to be predefined, as shown in FIG. 11. During sending, the UE selects, based on a current service requirement, one sub resource from sub resources corresponding to a CTU required by a service of the UE on the first resource, for transmitting a grant-free transmission request signal.

For the Opt 2, alternatively, sub resources may not be used to distinguish corresponding different CTU types. Instead, grant-free transmission request signals are grouped, and grant-free transmission request signals in different groups correspond to different CTU types. During sending, the UE selects one orthogonal sequence from a corresponding grant-free transmission request signal group based on a current service requirement, and then selects a sub resource from the first resource for transmitting the selected orthogonal sequence. The base station determines, based on the group to which the detected orthogonal sequence belongs, which type of CTU is currently requested by the UE.

Embodiment 3 of this Application

A plurality of second resources are consecutively configured.

Figure 12:
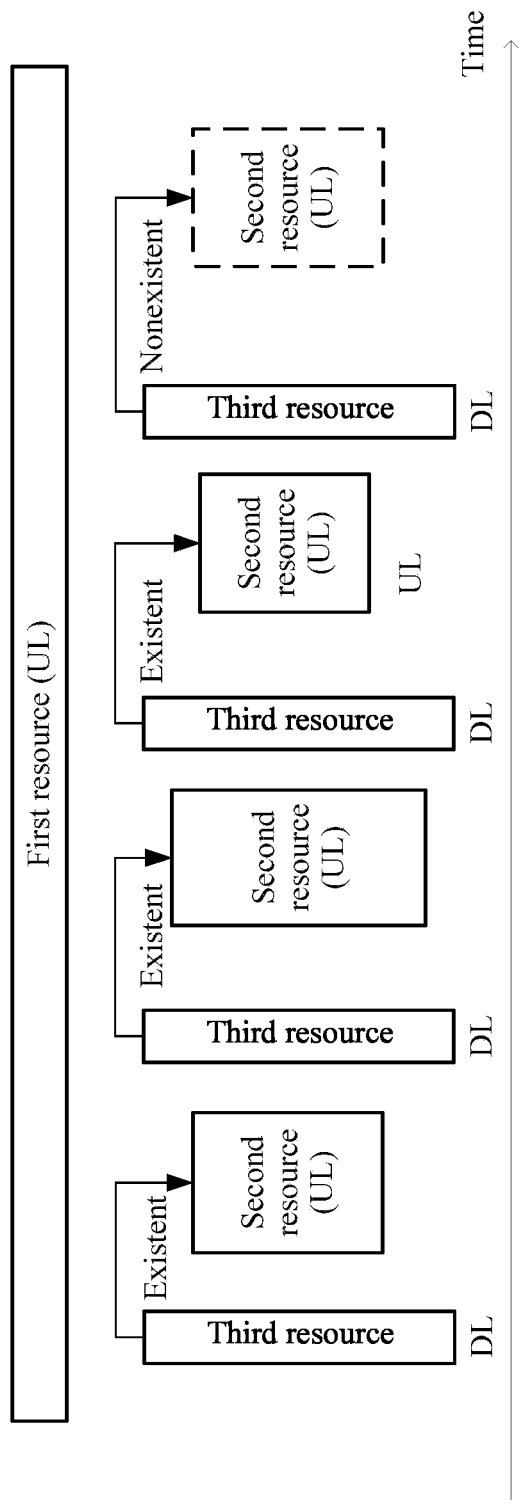
FIG. 12 is a schematic structural diagram of a first resource, a plurality of second resources, and a third resource according to another embodiment of this application.

After configuring a second resource, a base station may detect that a transmission collision still exists on the second resource. In this case, the base station may further continue to configure more second resources, and a size of a next second resource may be determined based on a receiving status of the base station on a previous second resource, as shown in FIG. 12. Certainly, before each second resource, the base station may send second resource indication information by using a third resource, indicating a configuration of a subsequent second resource.

For how the base station specifically determines the size of the next second resource based on the receiving status on the previous second resource, refer to the method for determining the size of the second resource by the base station based on the receiving status on the first resource in Embodiment 2. However, it should be especially noted that, regardless of whether first information sent on the first resource is an initial transmission version of data (corresponding to the Opt 1) or is a grant-free transmission request signal (Opt 2), when determining the size of the next second resource based on the receiving status on the previous second resource, the base station can only use the method in the Opt 1 in Embodiment 2, because grant-free data rather than a grant-free transmission request signal is transmitted on the previous second resource.

Similarly to Embodiment 2, the second resource may include a plurality of CTU types, where sizes of CTUs of different types are different. For example, sizes of CTUs of three types are respectively applicable to data transmission of different services. In this case, that the base station determines the size of the next second resource based on the receiving status on the previous second resource may be specifically: the base station determines, based on a receiving status on each type of CTU in the previous second resource, a quantity of CTUs of a corresponding type that should be configured in the next second resource. For example, three types of CTUs of different sizes are denoted as a CTU 1, a CTU 2, and a CTU 3 respectively, and the previous second resource includes three CTUs 1, five CTUs 2, and eight CTUs 3. The base station determines, based on receiving statuses on the three CTUs 1 in the previous second resource, that two CTUs 1 further need to be scheduled in the next second resource, determines, based on receiving statuses on the five CTUs 2 in the previous second resource, that no CTU 2 needs to be scheduled in the next second resource, and determines, based on receiving statuses on the eight CTUs 3 in the previous second resource, that three CTUs 2 further need to be scheduled in the next second resource. In this way, the base station schedules two CUTs 1 and three CTUs 2 in the next second resource. With respect to a given CTU type, for how the base station determines, based on receiving on the CTU of the type in the previous second resource, a quantity of CTUs of the type that should be configured in the next second resource, refer to the method for determining, based on receiving on the CTU of the type in the first resource, the quantity of CTUs of the type that should be configured in the second resource in Embodiment 2 (Opt 1).

No definite correspondence exists between the number of each embodiment provided above and the number of each of the following embodiments. The numbers are intended only for ease of description in this part.

Embodiments provided in this application include any one of the following:

1. A method for configuring a grant-free transmission resource pool, where the method includes:

detecting, by a base station, first information on a first resource, where the first information is transmitted by UE in a grant-free mode; and sending, by the base station, second resource indication information, where the second resource indication information is used to indicate a configuration of a second resource, the second resource is used by the UE to send second information, and the second resource indication information is determined by the base station based on detection of the first information.

The base station flexibly determines, based on a detection status on the first resource, whether to configure the second resource and a size of the second resource to be configured, to flexibly configure the resource based on a requirement and improve utilization of a grant-free transmission resource.

2. The method according to Embodiment 1, where the first information is grant-free initial transmission data sent by the UE, and the second information is a retransmission version or a repetition version of the grant-free initial transmission data.

The first resource is used to transmit the grant-free initial transmission data, so that the solution satisfies a latency requirement of a latency-sensitive service.

3. The method according to Embodiment 1, where the first information is a grant-free transmission request signal sent by the UE, the second information is grant-free data sent by the UE, and the grant-free transmission request signal is used to indicate that the UE has data to be transmitted in the grant-free mode.

The first resource may be used to transmit the grant-free transmission request signal, so that the second resource may be very small. Although the method is not applicable to the latency-sensitive service, resource utilization can be improved maximally.

4. The method according to any one of Embodiments 1 to 3, where before the base station detects the first information on the first resource, the base station sends first resource indication information, where the first resource indication information is used to indicate a configuration of the first resource.

The first resource is a basic resource for grant-free transmission, is periodic, and is configured by the base station in a semi-static mode.

5. The method according to any one of Embodiments 1 to 4, where the second resource indication information is used to indicate whether the base station configures the second resource.

The second resource indication information indicates whether the second resource is configured. This can improve resource utilization, and indication overheads are low.

6. The method according to any one of Embodiments 1 to 4, where the second resource indication information is used to indicate a size of the second resource.

The second resource indication information indicates the size of the second resource. This can improve resource utilization, and the indication is more flexible.

7. The method according to Embodiment 5 or 6, where the second resource indication information is carried by group common DCI or a PHICH or a PHICH-like.

Existing signaling is reused as much as possible to carry the second resource indication information, so that an increase of system complexity caused by a new signaling design is avoided.

8. The method according to any one of Embodiments 1 to 7, where the first resource includes a plurality of sub resources, and that the second resource indication information is determined by the base station based on detection of the first information includes:

the base station determines the size of the second resource based on detection results on the plurality of sub resources in the first resource, where the second resource indication information indicates the size of the second resource.

A method for determining the size of the second resource based on detection of the first information in the first resource is provided.

9. The method according to any one of Embodiments 1 to 8, where before the base station detects the first information on the first resource, the base station sends a switch indication, where the switch indication is used to indicate that the UE needs to send the first information on the first resource when the UE has grant-free data to be transmitted.

A mechanism for improving resource utilization according to this application may be enabled or disabled by using the switch indication. Therefore, the base station can perform a flexible configuration based on a situation, and resource utilization is improved as much as possible.

10. A method for configuring a grant-free transmission resource pool, where the method includes:

sending, by UE, first information on a first resource to a base station; and receiving, by the UE, second resource indication information sent by the base station, where the second resource indication information is used to indicate a configuration of a second resource, the second resource is used by the UE to send second information, and the second resource indication information is determined by the base station based on detection of the first information.

The base station flexibly determines, based on a detection status on the first resource, whether to configure the second resource and a size of the second resource to be configured, to flexibly configure the resource based on a requirement and improve utilization of a grant-free transmission resource.

11. The method according to Embodiment 10, where the first information is grant-free initial transmission data sent by the UE, and the second information is a retransmission version or a repetition version of the grant-free initial transmission data.

The first resource is used to transmit the grant-free initial transmission data, so that the solution satisfies a latency requirement of a latency-sensitive service.

12. The method according to Embodiment 10, where the first information is a grant-free transmission request signal sent by the UE, the second information is grant-free data sent by the UE, and the grant-free transmission request signal is used to indicate that the UE has data to be transmitted in the grant-free mode.

The first resource may be used to transmit the grant-free transmission request signal, so that the second resource may be very small. Although the method is not applicable to the latency-sensitive service, resource utilization can be improved maximally.

13. The method according to any one of Embodiments 10 to 12, where before the UE sends the first information on the first resource to the base station, the UE receives first resource indication information sent by the base station, where the first resource indication information is used to indicate a configuration of the first resource.

The first resource is a basic resource for grant-free transmission, is periodic, and is configured by the base station in a semi-static mode.

14. The method according to any one of Embodiments 10 to 13, where the second resource indication information is used to indicate whether the base station configures the second resource.

The second resource indication information indicates whether the second resource is configured. This can improve resource utilization, and indication overheads are low.

15. The method according to any one of Embodiments 10 to 13, where the second resource indication information is used to indicate a size of the second resource.

The second resource indication information indicates the size of the second resource. This can improve resource utilization, and the indication is more flexible.

16. The method according to Embodiment 14 or 15, where the second resource indication information is carried by group common DCI or a PHICH or a PHICH-like.

Existing signaling is reused as much as possible to carry the second resource indication information, so that an increase of system complexity caused by a new signaling design is avoided.

17. The method according to any one of Embodiments 10 to 16, where the first resource includes a plurality of sub resources, and that the second resource indication information is determined by the base station based on detection of the first information includes:

the base station determines the size of the second resource based on detection results on the plurality of sub resources in the first resource, where the second resource indication information indicates the size of the second resource.

A method for determining the size of the second resource based on detection of the first information in the first resource is provided.

18. The method according to any one of Embodiments 10 to 17, where before the UE sends the first information on the first resource to the base station, the UE receives a switch indication sent by the base station, where the switch indication is used to indicate that the UE needs to send the first information on the first resource when the UE has grant-free data to be transmitted.

A mechanism for improving resource utilization according to this application may be enabled or disabled by using the switch indication. Therefore, the base station can perform a flexible configuration based on a situation, and resource utilization is improved as much as possible.

19. A base station, where the base station includes:

a processor, a memory, a transceiver, and a bus, where the processor, the transceiver, and the memory communicate with each other by using the bus;

the transceiver is configured to receive and send data;

the memory is configured to store an instruction; and the processor is configured to execute the instruction in the memory, to perform the method according to any one of Embodiments 1 to 9.

20. The base station according to Embodiment 19, where the transceiver includes:

a transmitter and a receiver, where the transmitter is configured to send the first resource indication information, the second resource indication information, and the switch indication according to any one of Embodiments 1 to 9; and the receiver is configured to receive the first information and the second information that are sent by a terminal according to any one of Embodiments 1 to 9.

21. A terminal, where the terminal includes:
a processor, a memory, a transceiver, and a bus, where
the processor, the transceiver, and the memory communicate with each other by using the bus:
the transceiver is configured to receive and send data;
the memory is configured to store an instruction; and
the processor is configured to execute the instruction in the memory, to perform the method according to any one of Embodiments 10 to 18.

22. The terminal according to Embodiment 21, where the transceiver includes:
a transmitter and a receiver, where
the receiver is configured to receive the first resource indication information, the second resource indication information, and the switch indication according to any one of Embodiments 10 to 18; and
the transmitter is configured to send the first information and the second information based on the configuration information according to any one of Embodiments 10 to 18.

23. A base station, where the base station is configured to perform the method according to any one of Embodiments 1 to 9.

24. A terminal, where the terminal is configured to perform the method according to any one of Embodiments 10 to 18.

25. A computer program product, including a computer program, where when executed on a computer unit, the computer program enables the computer unit to implement the method according to any one of Embodiments 1 to 9.

26. A computer program product, including a computer program, where when executed on a computer unit, the computer program enables the computer unit to implement the method according to any one of Embodiments 10 to 18.

27. A computer program, where when executed on a computer unit, the computer program enables the computer unit to implement the method according to any one of Embodiments 1 to 9.

28. A computer program, where when executed on a computer unit, the computer program enables the computer unit to implement the method according to any one of Embodiments 10 to 18.

The foregoing describes the information transmission methods according to the embodiments of this application in detail with reference to FIG. 1 to FIG. 12. The following describes information transmission apparatuses according to the embodiments of this application with reference to FIG. 13 to FIG. 16. The technical features described in the method embodiments are also applicable to the following apparatus embodiments.

Figure 13:
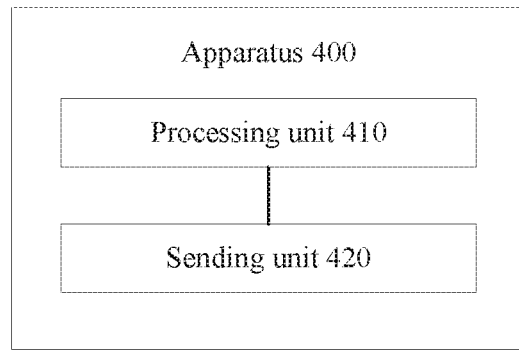
FIG. 13 is a schematic block diagram of an information transmission apparatus according to an embodiment of this application.

FIG. 13 is a schematic block diagram of an information transmission apparatus 400 according to an embodiment of this application. As shown in FIG. 13, the apparatus 400 includes:
a processing unit 410, configured to determine first indication information, where the first indication information is used to indicate a configuration of a second resource, the second resource is used to transmit retransmission data including retransmission data of first data, the first data is data sent by a first terminal device by using a first resource unit, the first resource unit belongs to a preconfigured first resource, the first resource and the second resource are both grant-free resources and are different from each other, and the first indication information is determined by the apparatus based on a receiving status of the first data; and a sending unit 420, configured to send the first indication information determined by the processing unit 410.

According to the information transmission apparatus in this embodiment of this application, the first resource used to transmit the data and the second resource used to transmit the retransmission data are set. Therefore, the apparatus can send, to the terminal device based on the receiving status of the data on the first resource, the first indication information used to indicate the configuration of the second resource. Therefore, the terminal device can determine, based on the first indication information, information related to the second resource. Therefore, when data transmission fails, the terminal device does not send the retransmission data on the original first resource, but can send the retransmission data directly on the second resource. This is equivalent to sending one part of currently transmitted data (that is, the retransmission data) by using the second resource, and sending another part of data (that is, initial transmission data) by using the first resource. A relatively large quantity of resources can increase a possibility of successful data transmission, and improve transmission efficiency. In addition, because the apparatus adjusts the resource configuration based on the receiving status of the data, resource configuration flexibility is also improved.

Optionally, the first indication information is specifically used to indicate whether the apparatus configures the second resource.

Optionally, the first indication information is specifically determined by the apparatus based on the receiving status of the first data and a receiving status of at least one piece of second data, the at least one piece of second data is carried on at least one resource unit in the first resource other than the first resource unit, the at least one piece of second data corresponds to at least one second terminal device on a one-to-one basis, and each piece of second data is sent by a corresponding second terminal device.

Therefore, the apparatus determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

Optionally, the first indication information is specifically further used to indicate a size of the second resource; and/or
the first indication information is specifically further used to indicate a position of the second resource.

Optionally, when the first indication information is specifically used to indicate that the apparatus configures the size of the second resource, the size of the second resource is determined by the apparatus based on a receiving status of data carried on the first resource.

Therefore, the apparatus flexibly adjusts the size of the second resource based on the receiving status of the data carried on the first resource, and configures a resource of an appropriate size for the terminal device. This can improve resource utilization while improving data transmission efficiency.

Optionally, the first resource includes a plurality of types of resource units, sizes of resource units of any two types are different, and the second resource includes at least one type of resource unit in the plurality of types of resource units, where a quantity of resource units of each type in the second resource is determined by the apparatus based on a receiving status of data carried on resource units of each type in the first resource.

The plurality of types of resource units are configured for the first resource, and the sizes and/or modulation and coding schemes of the resource units of any two types are different. Therefore, when the apparatus configures the size of the second resource, the apparatus can determine a quantity of resource units of a same type in the second resource based on the receiving status of the data carried on the resource units of each type in the first resource. In this way, the first terminal device can determine, based on a size of data that needs to be transmitted and/or a used modulation and coding scheme, an appropriate type of resource unit for sending the data. This can further improve data transmission efficiency.

Optionally, the sending unit 420 is further configured to:

send second indication information, where the second indication information is used to instruct the first terminal device to send data by using the first resource, and the apparatus configures the second resource based on a receiving status of the data.

Therefore, when little data is transmitted by using a grant-free resource or data transmission is infrequent, the apparatus can instruct, by using the second indication information based on a transmission status of current data, the first terminal device to use this embodiment of this application. To be specific, the second indication information is used to instruct the first terminal device to send the data by using the first resource, and the apparatus configures the second resource based on the receiving status of the data. This can effectively improve resource utilization.

The information transmission apparatus 400 may correspond to (for example, the apparatus may be configured as or the apparatus itself is) the network device described in the method 200, and each module or unit in the information transmission apparatus 400 is configured to perform each action or process performed by the network device in the method 200. Details are omitted herein to avoid repetition.

In this embodiment of this application, the apparatus 400 may be a network device. In this case, the apparatus 400 may include a processor, a transmitter, and a receiver, where the processor, the transmitter, and the receiver are communicatively connected to each other. Optionally, the apparatus further includes a memory, where the memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or the receiver to receive a signal.

In this case, the processing unit 410 in the apparatus 400 shown in FIG. 13 may correspond to the processor, and the sending unit 420 in the apparatus 400 shown in FIG. 13 may correspond to the transmitter. In another implementation, the transmitter and the receiver may be implemented by a same component, that is, a transceiver.

Figure 14:
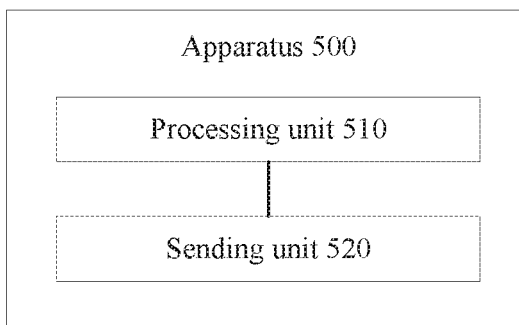
FIG. 14 is a schematic block diagram of an information transmission apparatus according to an embodiment of this application.

FIG. 14 is a schematic block diagram of an information transmission apparatus 500 according to an embodiment of this application. As shown in FIG. 14, the apparatus 500 includes:

a processing unit 510, configured to detect first transmission request information on a first resource, where the first transmission request information is used to indicate that a first terminal device needs to send data, the first transmission request information is carried on a first resource unit, the first resource unit belongs to a preconfigured first resource, and the first resource is a grant-free resource; and a sending unit 520, configured to send first indication information, where the first indication information is used to indicate whether a second resource is configured, the second resource is used to transmit data, the second resource is a grant-free resource, the second resource is different from the first resource, and the first indication information is determined by the apparatus based on a detection result of the first transmission request information.

According to the information transmission apparatus in this embodiment of this application, the first resource used to send the transmission request information and the second resource used to send the data are set. Therefore, the network device can determine, based on an actual requirement of the apparatus and based on the detection result of the transmission request information sent on the first resource, whether to configure the second resource. Therefore, when the apparatus has a data requirement, the apparatus sends the data by using the second resource configured by the network device; and the network device does not configure the second resource in a time period in which there is no data transmission requirement. This effectively improves resource configuration flexibility.

Optionally, when the first indication information is used to indicate the second resource, the first indication information is further used to indicate a size of the second resource; and/or the first indication information is further used to indicate a position of the second resource.

Optionally, the size of the second resource is determined by the apparatus based on the detection result of the transmission request information carried on the first resource.

Therefore, the network device flexibly adjusts the size of the second resource based on the detection status of the transmission request information carried on the first resource, and configures the second resource of the appropriate size for the apparatus. This can improve resource utilization while improving data transmission efficiency.

Optionally, the first resource includes a plurality of types of resource units, and data types of data indicated by transmission request information carried on resource units of any two types in the first resource are different:

the second resource includes at least one type of resource unit, sizes of resource units of any two types in the at least one type of resource unit in the second resource are different, the at least one type of resource unit in the second resource corresponds to at least one type of resource unit in the first resource on a one-to-one basis, the at least one type of resource unit in the first resource belongs to the plurality of types of resource units in the first resource, each type of resource unit in the second resource corresponds to a data type of data indicated by transmission request information carried on a corresponding resource unit in the first resource, the data type is used to indicate a size of a corresponding resource unit in the second resource, and/or the data type is used to indicate a modulation and coding scheme of data carried on a corresponding resource unit in the second resource; and a quantity of resource units of each type in the second resource is determined by the apparatus based on a detection result of transmission request information carried on a corresponding resource unit in the first resource.

The plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the terminal device can determine, based on a size of the data that needs to be transmitted, an appropriate type of resource unit for sending the data on the second resource. This can further improve data transmission efficiency.

Optionally, the sending unit 520 is further configured to:
send third indication information, where the third indication information is used to instruct the first terminal device to send transmission request information by using the first resource, and the apparatus configures the second resource based on a detection result of the transmission request information.

Therefore, when little data is transmitted by using a grant-free resource or data transmission is infrequent, the network device can instruct, by using the third indication information based on a transmission status of current data, the terminal device to use this embodiment of this application. To be specific, the third indication information is used to instruct the apparatus to send the transmission request information by using the first resource, and the network device configures the second resource based on the detection result of the transmission request information. This can effectively improve resource utilization.

The information transmission apparatus 500 may correspond to (for example, the apparatus may be configured as or the apparatus itself is) the network device described in the method 300, and each module or unit in the information transmission apparatus 500 is configured to perform each action or process performed by the network device in the method 300. Details are omitted herein to avoid repetition.

In this embodiment of this application, the apparatus 500 may be a network device. In this case, the apparatus 500 may include a processor, a transmitter, and a receiver, where the processor, the transmitter, and the receiver are communicatively connected to each other. Optionally, the apparatus further includes a memory, where the memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or the receiver to receive a signal.

In this case, the processing unit 510 in the apparatus 500 shown in FIG. 14 may correspond to the processor, and the sending unit 520 in the apparatus 500 shown in FIG. 14 may correspond to the transmitter. In another implementation, the transmitter and the receiver may be implemented by a same component, that is, a transceiver.

Figure 15:
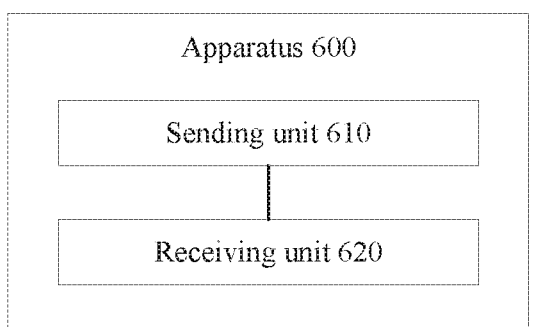
FIG. 15 is a schematic block diagram of an information transmission apparatus according to an embodiment of this application.

FIG. 15 is a schematic block diagram of an information transmission apparatus 600 according to an embodiment of this application. As shown in FIG. 15, the apparatus 600 includes:

a sending unit 610, configured to send first data on a first resource unit, where the first resource unit belongs to a first resource, and the first resource is a preconfigured grant-free resource; and a receiving unit 620, configured to receive first indication information, where the first indication information is used to indicate a configuration of a second resource, the second resource is used to transmit retransmission data including retransmission data of the first data, the second resource is a grant-free resource, the second resource is different from the first resource, and the first indication information is determined by the network device based on a receiving status of the first data; where the sending unit 610 is further configured to perform data transmission based on the first indication information received by the receiving unit 620.

According to the information transmission apparatus in this embodiment of this application, the first resource used to transmit the data and the second resource used to transmit the retransmission data are set. Therefore, the network device can send, to the terminal device based on the receiving status of the data on the first resource, the first indication information used to indicate the configuration of the second resource. Therefore, the apparatus can determine, based on the first indication information, information related to the second resource. Therefore, when data transmission fails, the apparatus does not send the retransmission data on the original first resource, but can send the retransmission data directly on the second resource. This is equivalent to sending one part of currently transmitted data (that is, the retransmission data) by using the second resource, and sending another part of data (that is, initial transmission data) by using the first resource. A relatively large quantity of resources can increase a possibility of successful data transmission, and improve transmission efficiency. In addition, because the network device adjusts the resource configuration based on the receiving status of the data, resource configuration flexibility is also improved.

Optionally, the first indication information is specifically used to indicate whether the network device configures the second resource.

Optionally, the first indication information is specifically determined by the network device based on the receiving status of the first data and a receiving status of at least one piece of second data, the at least one piece of second data is carried on at least one resource unit in the first resource other than the first resource unit, the at least one piece of second data corresponds to at least one second terminal device on a one-to-one basis, and each piece of second data is sent by a corresponding second terminal device.

Therefore, the network device determines, based on a receiving status of at least one piece of data transmitted on the first resource, whether to configure the second resource. In other words, the second resource is configured only when a condition is satisfied, or the second resource is not configured when a condition is not satisfied. This greatly improves flexibility of resource utilization, and can improve resource utilization to some extent.

Optionally, the first indication information is specifically further used to indicate a size of the second resource; and/or
the first indication information is specifically further used to indicate a position of the second resource.

Optionally, when the first indication information is specifically used to indicate that the apparatus configures the size of the second resource, the size of the second resource is determined by the apparatus based on a receiving status of data carried on the first resource.

Therefore, the network device flexibly adjusts the size of the second resource based on the receiving status of the data carried on the first resource, and configures a resource of an appropriate size for the terminal device. This can improve resource utilization while improving data transmission efficiency.

Optionally, the first resource includes a plurality of types of resource units, sizes of resource units of any two types are different, and the second resource includes at least one type of resource unit in the plurality of types of resource units, where a quantity of resource units of each type in the second resource is determined by the apparatus based on a receiving status of data carried on resource units of each type in the first resource.

The plurality of types of resource units are configured for the first resource, and the sizes and/or modulation and coding schemes of the resource units of any two types are different. Therefore, when the network device configures the size of the second resource, the network device can determine a quantity of resource units of a same type in the second resource based on the receiving status of the data carried on the resource units of each type in the first resource. In this way, the first terminal device can determine, based on a size of data that needs to be transmitted and/or a used modulation and coding scheme, an appropriate type of resource unit for sending the data. This can further improve data transmission efficiency.

Optionally, the receiving unit 620 is further configured to:
receive second indication information, where the second indication information is used to instruct the apparatus to send data by using the first resource, and the network device configures the second resource based on a receiving status of the data.

When little data is transmitted by using a grant-free resource or data transmission is infrequent, the network device can instruct, by using the second indication information based on a transmission status of current data, the apparatus to use this embodiment of this application. To be specific, the second indication information is used to instruct the apparatus to send the data by using the first resource, and the network device configures the second resource based on the receiving status of the data. This can effectively improve resource utilization.

The information transmission apparatus 600 may correspond to (for example, the apparatus may be configured as or the apparatus itself is) the first terminal device described in the method 200, and each module or unit in the information transmission apparatus 600 is configured to perform each action or process performed by the first terminal device in the method 200. Details are omitted herein to avoid repetition.

In this embodiment of this application, the apparatus 600 may be the first terminal device. In this case, the apparatus 600 may include a processor, a transmitter, and a receiver, where the processor, the transmitter, and the receiver are communicatively connected to each other. Optionally, the apparatus further includes a memory, where the memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or the receiver to receive a signal.

In this case, the sending unit 610 in the apparatus 600 shown in FIG. 15 may correspond to the transmitter, and the receiving unit 620 in the apparatus 600 shown in FIG. 15 may correspond to the receiver. In another implementation, the transmitter and the receiver may be implemented by a same component, that is, a transceiver.

Figure 16:
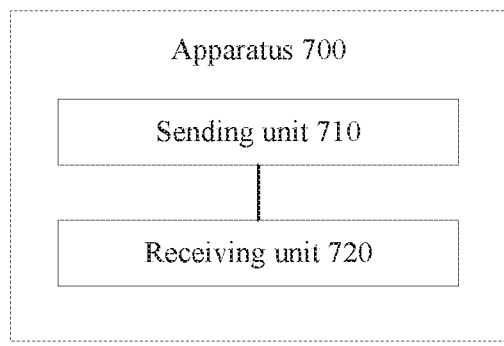
FIG. 16 is a schematic block diagram of an information transmission apparatus according to an embodiment of this application.

FIG. 16 is a schematic block diagram of an information transmission apparatus 700 according to an embodiment of this application. As shown in FIG. 16, the apparatus 700 includes:

a sending unit 710, configured to send first transmission request information, where the first transmission request information is used to indicate that the apparatus needs to send data, the first transmission request information is carried on a first resource unit, the first resource unit belongs to the first resource, and the first resource is a preconfigured grant-free resource; and a receiving unit 720, configured to receive first indication information, where the first indication information is used to indicate whether a second resource is configured, the second resource is used to transmit data, the second resource is a grant-free resource, the second resource is different from the first resource, and the first indication information is determined by the network device based on a detection result of the first transmission request information; where the sending unit 710 is further configured to perform data transmission based on the first indication information received by the receiving unit 720.

According to the information transmission apparatus in this embodiment of this application, the first resource used to send the transmission request information and the second resource used to send the data are set. Therefore, the network device can determine, based on an actual requirement of the apparatus and based on the detection result of the transmission request information sent on the first resource, whether to configure the second resource. Therefore, when the apparatus has a data requirement, the apparatus sends the data by using the second resource configured by the network device; and the network device does not configure the second resource in a time period in which there is no data transmission requirement. This effectively improves resource configuration flexibility.

Optionally, when the first indication information is used to indicate the second resource, the first indication information is further used to indicate a size of the second resource; and/or the first indication information is further used to indicate a position of the second resource.

Optionally, the size of the second resource is determined by the apparatus based on the detection result of the transmission request information carried on the first resource.

Therefore, the network device flexibly adjusts the size of the second resource based on the detection status of the transmission request information carried on the first resource, and configures the second resource of the appropriate size for the apparatus. This can improve resource utilization while improving data transmission efficiency.

Optionally, the first resource includes a plurality of types of resource units, and data types of data indicated by transmission request information carried on resource units of any two types in the first resource are different:

the second resource includes at least one type of resource unit, sizes of resource units of any two types in the at least one type of resource unit in the second resource are different, the at least one type of resource unit in the second resource corresponds to at least one type of resource unit in the first resource on a one-to-one basis, the at least one type of resource unit in the first resource belongs to the plurality of types of resource units in the first resource, each type of resource unit in the second resource corresponds to a data type of data indicated by transmission request information carried on a corresponding resource unit in the first resource, the data type is used to indicate a size of a corresponding resource unit in the second resource, and/or the data type is used to indicate a modulation and coding scheme of data carried on a corresponding resource unit in the second resource; and a quantity of resource units of each type in the second resource is determined by the apparatus based on a detection result of transmission request information carried on a corresponding resource unit in the first resource.

The plurality of types of resource units are configured for the first resource, where each type of resource corresponds to at least one data type. Therefore, when the network device configures the size of the second resource, the network device can determine a quantity of corresponding resource units in the second resource based on a detection status of transmission request information (the transmission request information may indicate a data type of to-be-transmitted data) carried on the resource units of each type in the first resource. Therefore, the apparatus can determine, based on a size of the data that needs to be transmitted, an appropriate type of resource unit for sending the data on the second resource. This can further improve data transmission efficiency.

Optionally, the receiving unit 720 is further configured to:

receive third indication information, where the third indication information is used to instruct the apparatus to send the transmission request information by using the first resource, and the network device configures the second resource based on the detection result of the transmission request information.

Therefore, when little data is transmitted by using a grant-free resource or data transmission is infrequent, the network device can instruct, by using the third indication information based on a transmission status of current data, the apparatus to use this embodiment of this application. To be specific, the third indication information is used to instruct the apparatus to send the transmission request information by using the first resource, and the network device configures the second resource based on the detection result of the transmission request information. This can effectively improve resource utilization.

The information transmission apparatus 700 may correspond to (for example, the apparatus may be configured as or the apparatus itself is) the first terminal device described in the method 300, and each module or unit in the information transmission apparatus 700 is configured to perform each action or process performed by the first terminal device in the method 300. Details are omitted herein to avoid repetition.

In this embodiment of this application, the apparatus 700 may be the first terminal device. In this case, the apparatus 700 may include a processor, a transmitter, and a receiver, where the processor, the transmitter, and the receiver are communicatively connected to each other. Optionally, the apparatus further includes a memory, where the memory is communicatively connected to the processor. Optionally, the processor, the memory, the transmitter, and the receiver may be communicatively connected to each other. The memory may be configured to store an instruction. The processor is configured to execute the instruction stored in the memory, to control the transmitter to send information or the receiver to receive a signal.

In this case, the sending unit 710 in the apparatus 700 shown in FIG. 16 may correspond to the transmitter, and the receiving unit 720 in the apparatus 700 shown in FIG. 16 may correspond to the receiver. In another implementation, the transmitter and the receiver may be implemented by a same component, that is, a transceiver.

It should be noted that the foregoing method embodiments of this application may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM. DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memories in the systems and methods described in this specification include but are not limited to these and any memory of another appropriate type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. An information transmission method implemented by a network device, the information transmission method comprising:
    receiving first data from a first terminal device using a first resource unit, wherein the first resource unit belongs to a first resource that is preconfigured;
    determining first indication information based on;
        receiving a status of the first data, wherein the first indication information indicates a configuration of a second resource, wherein the second resource is configured to carry retransmission of the first data, and wherein the first resource and the second resource are both grant-free resources and are different from each other; and
        receiving a status of a piece of second data, wherein the piece of the second data is carried on a resource unit in the first resource other than the first resource unit, wherein the piece of the second data is sent by a corresponding second terminal device; and
    sending the first indication information to the first terminal device, wherein the first indication information indicates whether the network device configures the second resource.

2. The information transmission method of claim 1, wherein the first indication information further indicates a size of the second resource.

3. The information transmission method of claim 2, further comprising determining the size of the second resource based on a receiving status of data carried on the first resource when the first indication information indicates that the network device configures the size of the second resource.

4. The information transmission method of claim 3, wherein the first resource comprises a plurality of types of resource units, wherein sizes of the resource units of any two types are different, wherein the second resource comprises at least one type of resource unit in the types of the resource units, and wherein the information transmission method further comprises determining a quantity of resource units of each type in the second resource based on a receiving status of data carried on resource units of each type in the first resource.

5. The information transmission method of claim 1, wherein before sending the first indication information, the information transmission method further comprises:
    sending second indication information to the first terminal device, wherein the second indication information instructs the first terminal device to send the first data using the first resource; and
    configuring the second resource based on the receiving status of the first data.

6. The information transmission method of claim 1, wherein the first indication information further indicates a position of the second resource.

7. An information transmission method implemented by a network device, the information transmission method comprising:
    detecting first transmission request information on a first resource, wherein the first transmission request information indicates that a first terminal device needs to send first data, wherein the first transmission request information is carried on a first resource unit, wherein the first resource unit belongs to a first resource that is preconfigured, and wherein the first resource is a grant-free resource;
    determining first indication information based on a detection result of the first transmission request information, wherein the first indication information indicates whether a second resource is configured, wherein the second resource carries second data, wherein the second resource is a subset of the first resource;
    sending the first indication information;
    sending second indication information, wherein the second indication information instructs the first terminal device to send the first transmission request information using the first resource; and reconfiguring the second resource based on the detection result of the first transmission request information.

8. The information transmission method of claim 7, wherein the first indication information further indicates a size of the second resource when the first indication information indicates the second resource.

9. The information transmission method of claim 8, further comprising determining the size of the second resource based on the detection result of the first transmission request information carried on the first resource.

10. The information transmission method of claim 9, wherein the first resource comprises a plurality of types of resource units, wherein data types of data indicated by transmission request information carried on resource units of any two types in the first resource are different, wherein the second resource comprises at least one type of resource unit, wherein sizes of resource units of any two types in the at least one type of resource unit in the second resource are different, wherein the at least one type of resource unit in the second resource corresponds to at least one type of resource unit in the first resource on a one-to-one basis, wherein the at least one type of resource unit in the first resource belongs to the types of the resource units in the first resource, wherein each of the types of resource units in the second resource corresponds to a data type of data indicated by transmission request information carried on a corresponding resource unit in the first resource, wherein the data type indicates either a size of a corresponding resource unit in the second resource or a modulation and coding scheme of data carried on a corresponding resource unit in the second resource, and wherein the information transmission method further comprises determining a quantity of resource units of each type in the second resource based on a detection result of transmission request information carried on a corresponding resource unit in the first resource.

11. The information transmission method of claim 7, wherein the first indication information further indicates a position of the second resource.

12. The information transmission method of claim 1, wherein the first indication information further indicates a period of the second resource.

13. The information transmission method of claim 7, wherein the first indication information further indicates a period of the second resource.

14. An information transmission apparatus, comprising:
a processor configured to:
receive first data from a first terminal device using a first resource unit, wherein the first resource unit belongs to a first resource that is preconfigured; and
determine first indication information based on;
receiving a status of the first data, wherein the first indication information indicates a configuration of a second resource, wherein the second resource is configured to carry retransmission of the first data, and wherein the first resource and the second resource are both grant-free resources and are different from each other; and
receiving a status of a piece of second data, wherein the piece of the second data is carried on a resource unit in the first resource other than the first resource unit, wherein the piece of the second data is sent by a corresponding second terminal device; and
a transmitter coupled to the processor and configured to send the first indication information, wherein the first indication information indicates whether the processor configures the second resource.

15. The information transmission apparatus of claim 14, wherein the first indication information further indicates a size of the second resource.

16. The information transmission apparatus of claim 15, wherein the processor is further configured to determine the size of the second resource based on a receiving status of data carried on the first resource when the first indication information indicates that the processor configures the size of the second resource.

17. The information transmission apparatus of claim 16, wherein the first resource comprises a plurality of types of resource units, wherein sizes of the resource units of any two types are different, wherein the second resource comprises at least one type of resource unit in the types of the resource units, and wherein the processor is further configured to determine a quantity of resource units of each type in the second resource based on a receiving status of data carried on resource units of each of the types in the first resource.

18. The information transmission apparatus of claim 14, wherein the transmitter is further configured to send second indication information, wherein the second indication information instructs the first terminal device to send the first data using the first resource, and wherein the processor is further configured to configure the second resource based on the receiving status of the first data.

19. The information transmission apparatus of claim 14, wherein the first indication information further indicates a position of the second resource.

20. The information transmission apparatus of claim 14, wherein the first indication information further indicates a period of the second resource.

* * * * *

UNITED STATES PATENT AND TRADEMARK OFFICE
CERTIFICATE OF CORRECTION

PATENT NO. : 11,184,135 B2
APPLICATION NO. : 16/614929
DATED : November 23, 2021
INVENTOR(S) : Zhenguo Du, Hongcheng Zhuang and Zhiming Ding It is certified that error appears in the above-identified patent and that said Letters Patent is hereby corrected as shown below:

On the Title Page

Item [57], Line 1: "method apparatus, where" should read "method and apparatus, where"

Signed and Sealed this
Twenty-sixth Day of April, 2022

Katherine Kelly Vidal
*Director of the United States Patent and Trademark Office*